(12) United States Patent
Ohashi et al.

(10) Patent No.: US 7,842,389 B2
(45) Date of Patent: Nov. 30, 2010

(54) CURABLE SURFACE MODIFIER AND CURABLE COMPOSITION FOR SURFACE MODIFICATION PREPARED FROM SAME

(75) Inventors: Mihoko Ohashi, Settsu (JP); Kazuyuki Sato, Settsu (JP); Takayuki Araki, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 1085 days.

(21) Appl. No.: 10/559,657

(22) PCT Filed: May 26, 2004

(86) PCT No.: PCT/JP2004/007179

§ 371 (c)(1),
(2), (4) Date: Dec. 5, 2005

(87) PCT Pub. No.: WO2004/108772

PCT Pub. Date: Dec. 16, 2004

(65) Prior Publication Data

US 2006/0147722 A1 Jul. 6, 2006

(30) Foreign Application Priority Data

Jun. 5, 2003 (JP) ............................. 2003-161227
Oct. 15, 2003 (JP) ............................. 2003-355455

(51) Int. Cl.
*C08L 27/12* (2006.01)
(52) U.S. Cl. ........................ 428/421; 428/422; 524/544; 525/199; 526/242; 526/243; 526/245; 526/247
(58) Field of Classification Search ................. 428/421, 428/422; 525/199, 242, 243, 245, 247; 524/544
See application file for complete search history.

(56) References Cited

U.S. PATENT DOCUMENTS 5,021,527 A * 6/1991 Ohmori et al. .............. 526/245
6,906,115 B2 * 6/2005 Hanazawa et al. ............ 522/97

FOREIGN PATENT DOCUMENTS

| EP | 333083 A2 | * | 9/1989 |
| EP | 1 347 001 A1 | | 9/2003 |
| JP | 10-212325 | * | 8/1998 |
| JP | 10-212325 A | | 8/1998 |
| JP | 2000-017028 | * | 1/2000 |
| JP | 2000-17028 A | | 1/2000 |
| JP | 2001-200019 | * | 7/2001 |
| JP | 2001-200019 A | | 7/2001 |
| WO | 02/18457 A1 | | 3/2002 |
| WO | WO-2004/108772 A1 | * | 12/2004 |

* cited by examiner

*Primary Examiner*—Peter D. Mulcahy
*Assistant Examiner*—Henry Hu
(74) *Attorney, Agent, or Firm*—Sughrue Mion, PLLC

(57) ABSTRACT

There is provided a curable surface modifier comprising a resin which is soluble in a general purpose solvent and comprises a fluorine-containing ethylenic polymer containing, in at least a part of its side chain, a moiety A having a long polyfluoropolyether chain and/or a moiety B having a self-crosslinkable functional group, in which the resin contains both of the moieties A and B. The curable surface modifier improves properties of surfaces of various coating films, especially antireflection films, such as surface sliding property (decrease in a friction coefficient), surface hardness, abrasion resistance, chemical resistance and stain removability by wiping, thus being capable of imparting modified properties to the surfaces of original coating films.

5 Claims, No Drawings

CURABLE SURFACE MODIFIER AND CURABLE COMPOSITION FOR SURFACE MODIFICATION PREPARED FROM SAME

TECHNICAL FIELD

The present invention relates to an invention for improving surface properties of various coating films, particularly surface sliding property (decrease in friction coefficient), surface hardness, abrasion resistance, chemical resistance, stain removability by wiping, water repellency, oil repellency and solvent resistance to impart modified surface properties to the original coating films.

Particularly the present invention relates to an invention which makes it possible to improve surface sliding property without lowering transparency of an antireflection film and maintain reflection reducing ability for a long period of time.

BACKGROUND ART

In image display units such as monitors of television set and office automation system, in order to prevent or decrease surface reflection, an antireflection film is provided on an image plane of image display units (for example, International Patent Publication WO 02/18457).

However an antireflection film has a very thin thickness of 0.03 to 0.5 μm to secure transparency, and a surface sliding property thereof is not good (a friction coefficient is high). Therefore there is a case where the film is damaged or peeled by wiping off stains on its surface repeatedly.

For improving surface sliding property, there is generally known a method of applying a liquid water- and oil-repellent agent such as a low molecular weight silicone oil or a fluorine-containing oil or a method of admixing a liquid water- and oil-repellent agent. However there is no long-lasting effect of the agent.

Also there is proposed a method of improving surface sliding property by applying a polymer (for example, JP10-287719A). JP10-287719A says that according to the method proposed therein, a friction coefficient of a surface of a substrate such as glass can be decreased, abrasion resistance can be given to the surface, a surface hardness can be increased, a water contact angle can be increased, and chemical resistance can be enhanced by applying, on the substrate, a hydrogen-containing polymer modified by fluorination, which is obtained by polycondensation reaction, polyaddition reaction or graft-reaction of a hydrogen-containing monomer or polymer (for example, polyurethane, polyacrylate or the like) with a fluorination modifier having a perfluoropolyether structure represented by the formula:

RfO(CF$_2$CF$_2$O)$_m$(CF$_2$O)$_n$CF$_2$-A$_q$-T$_p$ wherein Rf is a perfluoroalkyl group having 1 to 3 carbon atoms; A is a crosslinkable group bonded to an end of —CF$_2$— (a bond such as an alkylene group or an oxyalkylene group but not a crosslinkable functional group); T is a reactive functional group, and then carrying out UV crosslinking or peroxide crosslinking.

However the hydrogen-containing polymer modified by fluorination, which is disclosed in JP10-287719A is synthesized by reacting a fluorination modifier with a hydrogen-containing polymer on a substrate surface when forming a thin film. Further this fluorination modifier, particularly a fluorination modifier having a highly fluorinated long chain fluoropolyether structure being excellent in stain-proofing property and sliding property is soluble in fluorine-containing solvents but is insufficient in solubility in general purpose solvents. Therefore a fluorine-containing solvent is required in synthesizing and coating steps, which results in high cost and much burden on environment.

The present inventors made intensive studies to develop a surface modifier which improves surface sliding property, is soluble in non-fluorine-containing general purpose solvents and makes it easy to form a thin film, and completed the present invention.

DISCLOSURE OF INVENTION

Namely, the present invention relates to a curable surface modifier (the first invention) comprising a curable fluorine-containing resin (I) which is soluble in general purpose solvents and comprises a fluorine-containing ethylenic polymer (IAB) having a moiety A and moiety B in at least a part of the same side chain or different side chains thereof or comprises a fluorine-containing ethylenic polymer (IA) having a moiety A in at least a part of its side chain and a fluorine-containing ethylenic polymer (IB) having a moiety B in at least a part of its side chain, in which the moiety A has, at its end, one or two or more polyfluoropolyether chains P represented by the formula (1):

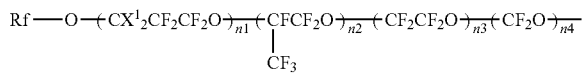

wherein n1, n2, n3 and n4 are the same or different and each is 0 or an integer of 1 or more and n1+n2+n3+n4 is an integer of 7 to 40; X$^1$ are the same or different and each is H, F or Cl; Rf is a fluorine-containing alkyl group having 1 to 10 carbon atoms, the moiety B has one or two or more self-crosslinkable functional groups Y at its end, and an ethylenic polymer moiety M remaining by excluding the moiety A and the moiety B from the fluorine-containing ethylenic polymer constituting the resin (I) does not contain fluorine atom or is an ethylenic polymer moiety in which a part of hydrogen atoms thereof are replaced by fluorine atoms up to a fluorine content of not more than 10% by weight.

It is preferable that the fluorine content of curable fluorine-containing resin (I) which is soluble in general purpose solvents is not less than 0.1% by weight and not more than 35% by weight since enhancement of surface sliding property and solubility in a general purpose solvent can be well-balanced.

In the fluorine-containing ethylenic polymer constituting the resin (I), it is preferable from the viewpoint of excellent solubility in general purpose solvents that the structural unit of the ethylenic polymer moiety M remaining by excluding the moieties A and B is a structural unit of the formula (2):

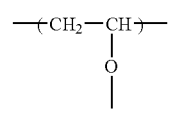

or the formula (3):

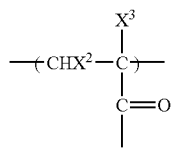

wherein $X^2$ is H or a bond; $X^3$ is H, F or $CH_3$.

Preferred example of the self-crosslinkable functional group Y of the moiety B is one selected from:

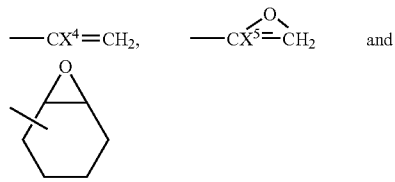

wherein $X^4$ is H, $CH_3$ or F; $X^5$ is H or $CH_3$, from the viewpoint of good curing reactivity by crosslinking.

This surface modifier of the first invention can be used alone or in a mixture with other components and additives for improving surface sliding property.

Also according to the present invention, there can be provided a method (the second invention) of modifying a surface of a substrate (including a substrate on which an antireflection film is formed) which comprises applying the curable surface modifier of the first invention on a substrate, preferably on an antireflection film and then carrying out curing thereof.

Further according to the present invention, there can be provided a surface-modified antireflection film of multi-layer structure (the third invention) which comprises an antireflection film and a continuous or discontinuous cured film of the curable surface modifier of the first invention which is formed directly on the antireflection film.

The present invention also relates to a composition for surface modification (the fourth invention) which is curable with active energy rays and comprises:
(a) the above-mentioned curable fluorine-containing resin (I) being soluble in general purpose solvents, and
(b) an active energy curing initiator.

Further the present invention relates to a composition for surface modification (the fifth invention) which is crosslinkable with active energy rays and comprises:
(a) the above-mentioned curable fluorine-containing resin (I) being soluble in general purpose solvents,
(b) an active energy curing initiator, and
(c) at least one general purpose solvent selected from the group consisting of ketone solvents, acetic acid ester solvents and alcohol solvents or a solvent mixture containing the general purpose solvent.

These compositions for surface modification are useful for improvement of surface sliding property.

Surface properties of a substrate (antireflection film) can be modified by applying the active energy crosslinkable composition for surface modification of the fourth or fifth invention on the substrate, preferably on the antireflection film and then carrying out irradiation of active energy rays for curing.

Further the present invention relates to an antireflection film (the sixth invention) obtained by applying, on a substrate, a composition for forming an antireflection film which comprises:

(d) a fluorine-containing resin (II) which is soluble in general purpose solvents, has a fluorine content of not less than 1% by weight and not more than 35% by weight and comprises a fluorine-containing ethylenic polymer (IAB) having a moiety A and moiety B in at least a part of the same side chain or different side chains thereof or a fluorine-containing ethylenic polymer (IA) having a moiety A in at least a part of its side chain, in which the moiety A has, at its end, one or two or more polyfluoropolyether chains P represented by the formula (1):

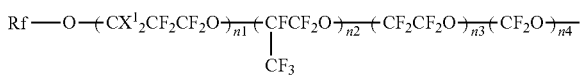

wherein n1, n2, n3 and n4 are the same or different and each is 0 or an integer of 1 or more and n1+n2+n3+n4 is an integer of 7 to 40; $X^1$ are the same or different and each is H, F or Cl; Rf is a fluorine-containing alkyl group having 1 to 10 carbon atoms, and an ethylenic polymer moiety MA remaining by excluding the moiety A and the moiety B from the fluorine-containing ethylenic polymer constituting the resin (II) does not contain fluorine atom or is an ethylenic polymer moiety in which a part of hydrogen atoms thereof are replaced by fluorine atoms up to a fluorine content of not more than 10% by weight, and
(e) a material for antireflection film.

Also the present invention relates to a curable resin composition (the seventh invention) comprising:
(1) a curable fluorine-containing resin (III) containing up to 100% by mole of a fluorine-containing polymer (II-INC) which has a number average molecular weight of 500 to 1,000,000 and is represented by the formula (4):

$$—(N)—(C)— \quad (4)$$

wherein the structural unit N is a structural unit derived from a fluorine-containing ethylenic monomer and represented by the formula (N):

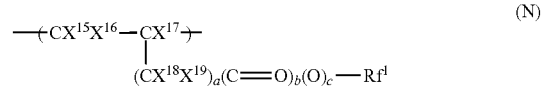

in which $X^{15}$ and $X^{16}$ are the same or different and each is H or F; $X^{17}$ is H, F, $CH_3$ or $CF_3$; $X^{18}$ and $X^{19}$ are the same or different and each is H, F or $CF_3$; $Rf^1$ is an organic group in which 1 to 3 $Y^1$ or $Y^2$ ($Y^1$ is a monovalent organic group having 2 to 10 carbon atoms and an ethylenic carbon-carbon double bond at its end and $Y^2$ is a monovalent organic group having 2 to 100 carbon atoms and 1 to 5 crosslinkable cyclic ether structures in which hydrogen atoms may be replaced by fluorine atoms) are bonded to a fluorine-containing alkyl group having 1 to 40 carbon atoms or a fluorine-containing alkyl group having 2 to 100 carbon atoms and ether bond; a is 0 or an integer of from 1 to 3; b and c are the same or different and each is 0 or 1, the structural unit C is a structural unit derived from a monomer copolymerizable with the fluorine-containing ethylenic monomer providing the structural unit N, and the structural units N and C are contained in amounts of from 0.1 to 100% by mole and from 0 to 99.9% by mole, respectively, and (2) the above-mentioned fluorine-containing resin (II) which is soluble in general purpose solvents.

Further the present invention relates to a method (the eighth invention) of forming a cured-article, particularly an antireflection film which comprises;

applying a liquid composition comprising:
(i) the material (e) for antireflection film which is used in the sixth invention or the curable fluorine-containing resin (III) which is used in the seventh invention,
(ii) the fluorine-containing resin (II) which is soluble in general purpose solvents and is used in the sixth invention, and
(iii) a solvent;

drying to form a coating film; and
curing the coating film.

In the present invention, "being soluble in general purpose solvents" means a property of being soluble in at least one of organic solvents having no fluorine atom (dissolving in a concentration of not less than 10% by weight at 25° C.). Examples of the organic solvents having no fluorine atom are, for instance, ketone solvents, ester solvents, alcohol solvents, propylene glycol solvents, cellosolve solvents, aromatic hydrocarbons, aliphatic hydrocarbons, ether solvents, acetal solvents, turpentine oil, a solvent mixture comprising the same kind or different kinds thereof, or a non-fluorine-containing solvent mixture containing any of these solvents. More concretely, representative examples thereof are methyl isobutyl ketone (MIBK), methyl ethyl ketone (MEK), propyl acetate, isopropyl alcohol (IPA) and a solvent mixture containing MIBK and dioxane in a weight ratio of 1/1.

BEST MODE FOR CARRYING OUT THE INVENTION

First, the curable fluorine-containing resin (I) which is soluble in general purpose solvents and is used in the first to fifth inventions is explained below.

The resin (I) comprises a fluorine-containing ethylenic polymer having the moiety A and/or the moiety B in at least a part of its side chain and is characterized by containing both of the moiety A and the moiety B and being soluble in general purpose solvents.

The fluorine-containing ethylenic polymers which may be contained in the resin (I) are the fluorine-containing ethylenic polymer (IAB) having the moiety A and the moiety B in at least a part of the same side chain or different side chains thereof, the fluorine-containing ethylenic polymer (IA) having the moiety A in at least a part of its side chain and the fluorine-containing ethylenic polymer (IB) having the moiety B in at least a part of its side chain.

The resin (I) may consist of the polymer (IAB), and may contain the polymer (IA) and/or the polymer (IB) in addition to the polymer (IAB). When the polymer (IAB) is not present in the resin (I), it is necessary that both of the polymer (IA) and the polymer (IB) are contained therein. As far as the above-mentioned requirements are satisfied, the resin (I) may contain a polymer MP other than the polymers (IAB), (IA) and (IB).

The curable fluorine-containing resin (I) comprising the fluorine-containing ethylenic polymer having the specific ethylenic polymer moiety M and the specific moiety A and moiety B provides a coating film having chemical resistance, transparency and a low refractive index in addition to the above-mentioned property. Also in order to impart properties required depending on purposes, the fluorine-containing ethylenic polymer may have, in the ethylenic polymer moiety M, a side chain having a moiety containing an optional functional group in addition to the moiety A and moiety B.

Next, the polymers (IAB), (IA), (IB) and the polymer MP are explained below.

The fluorine-containing ethylenic polymer (IAB) having self-crosslinkable functional group contains the moiety A and moiety B in at least a part of its side chain, and yet contains an ethylenic polymer moiety M which is a moiety remaining by excluding the moiety A and moiety B from the polymer (IAB).

In the fluorine-containing ethylenic polymer (IAB) having self-crosslinkable functional group which is used in the present invention, the ethylenic polymer moiety M enhances solubility in general purpose solvents, provides good coatability and film forming property and gives toughness to a coating film formed on a surface to be modified. The moiety A is a structure which causes sliding property to be exhibited on a surface to be modified, and imparts water- and oil-repellency and stain-proofing property. The moiety B does not have much effect on physical properties of the polymer (IAB) and the resin (I) when the self-crosslinkable functional group contained in its structure is in an unreacted state. However after the crosslinking reaction, the moiety B makes the polymer insoluble in solvents including general purpose solvents, and imparts, to a coating film formed on a surface to be modified, a high hardness not to cause deformation and damages on the coating film and further provides scratch resistance and abrasion resistance.

The ethylenic polymer moiety M has the functions of enhancing solubility of the fluorine-containing ethylenic polymer (IAB) in general purpose solvents, providing good coatability and film forming property and further giving toughness to the coating film formed on a surface to be modified, and can be obtained by polymerizing an ethylenic monomer. A monomer, in which a moiety (corresponding to the ethylenic polymer moiety M) other than the moieties A and B has no fluorine atom or has a fluorine content of not more than 10% by weight, is used as an ethylenic monomer to be polymerized. By the polymerization, the ethylenic polymer moiety M which has no fluorine atom or has a fluorine content of not more than 10% by weight in its backbone structure is formed.

The first preferred embodiment of the ethylenic polymer moiety M is one having a structural unit represented by the formula (2):

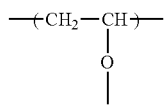

Particularly preferred are those having a structural unit such as:

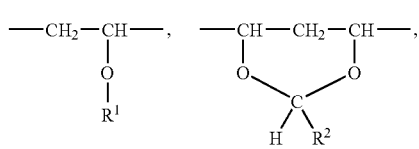

-continued

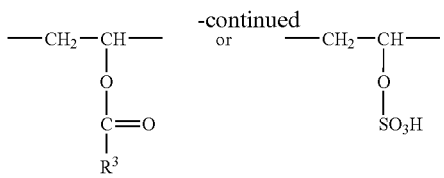

wherein $R^1$ to $R^3$ are the same or different and each is hydrogen atom, carboxyl or an organic group having 1 to 10 carbon atoms, from the viewpoint of good solubility in general purpose solvents, good compatibility between the polymers or with other component and good coatability and film forming property.

Preferred examples of $R^1$ are —H, —$CH_3$, —$CH_2CH_3$, —$CH_2COOH$, —$CH_2C_6H_5$, —$CH_2CH_2CN$,

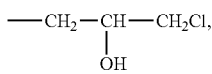

—$(CH_2CH_2O)_nH$ and the like, wherein n is an integer of 1 to 4.

Preferred examples of $R^2$ are —H, —$CH_3$, —$CH_2CH_3$, —$CH_2CH_2CH_3$, —$CH_2C_1$, —$C_6H_5$, —$NHCH_3$ and the like.

Preferred examples of $R^3$ are —$CH_3$, —$C_6H_5$, —$CH_2OH$, —COOH, —$CH_2Cl$, —$C_6H_4OH$ and the like.

The second preferred embodiment of the ethylenic polymer moiety M is one having a structural unit represented by the formula (3):

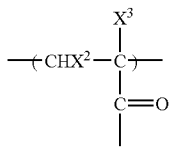

wherein $X^2$ is H or a bond; $X^3$ is H, F or $CH_3$,

Particularly preferred are those having a structural unit such as:

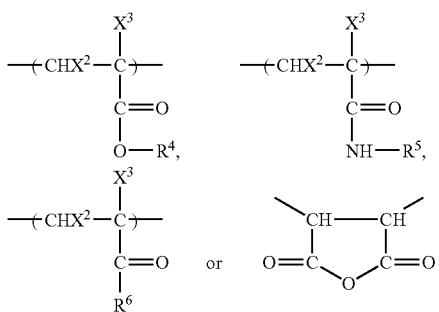

wherein $R^4$ to $R^6$ are the same or different and each is hydrogen atom, hydroxyl or an organic group having 1 to 10 carbon atoms, from the viewpoint of good solubility in general purpose solvents, good compatibility between the polymers or with other component and good coatability and film forming property.

Preferred examples of $R^4$ are —H, —$CH_3$, —$CH_2CH_3$, —$(CH_2)_3CH_3$, —$(CH_2)_5CH_3$, —$(CH_2)_2OH$,

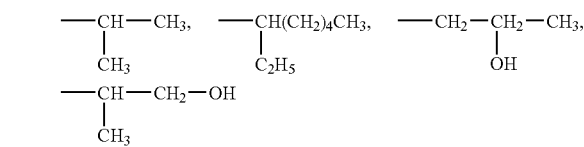

and the like.

Preferred examples of $R^5$ are —H, —$CH_{20}H$, —OH and the like.

Preferred examples of $R^6$ are —$CH_3$, —$CH_2CH_3$ and the like.

In addition, ethylenic polymer moieties having —OH, —COOH, —$NH_2$, —COCl, —NCO or the like are preferred as the polymer moiety M. Particularly those having a vinylamine structural unit, vinyl isocyanate structural unit or isopropenyl isocyanate structural unit are preferred.

The ethylenic polymer moiety M has the above-mentioned structural unit, and may have other structural unit derived from a comonomer.

Examples of other optional structural unit are, for instance,

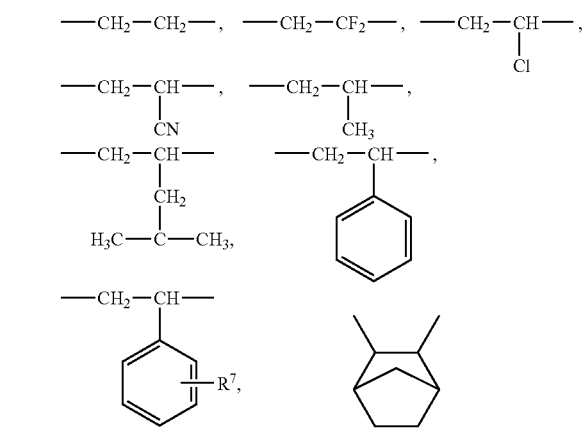

and the like, wherein $R^7$ is hydrogen atom, hydroxyl, carboxyl or an organic group having 1 to 10 carbon atoms.

These other structural units may be selected depending on required properties, and are used for imparting further toughness, hardness, adhesion to a substrate, coatability, solubility in specific solvents and the like to the fluorine-containing polymer (IAB) and further to the curable fluorine-containing resin (I).

Particularly preferred ethylenic polymer moiety M is one having, in its side chain, any of an ester group, cyclic acetal structure, hydroxyl or plural kinds thereof, from the viewpoint of good solubility in general purpose solvents, coatability and film forming property. Particularly those having a combination of a cyclic acetal structure with hydroxyl or a combination of an ester group with OH group are preferred especially because of excellent solubility in general purpose solvents.

Concretely there are:

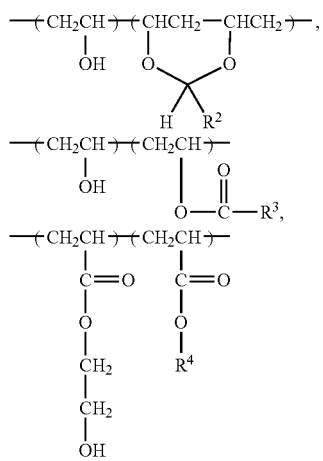

and the like, wherein $R^2$ to $R^4$ are as defined above. It is preferable that the structural unit having hydroxyl is contained in an amount of 0 to 80% by mole, further preferably 1 to 70% by mole, particularly preferably 5 to 60% by mole, from the viewpoint of excellent solubility in general purpose solvents.

Preferred ethylenic polymer moiety M is one having no fluorine atom from the viewpoint of solubility in general purpose solvents. However a part of hydrogen atoms thereof may be replaced by fluorine atoms for the purposes of enhancing compatibility with other specific fluorine-containing resin and decreasing a refractive index. In that case, the fluorine content of ethylenic polymer moiety M is preferably not more than 10% by weight, further preferably not more than 5% by weight lest solubility should be lowered.

The moiety A is a structure which causes sliding property to be exhibited on a surface to be modified and further imparts water- and oil-repellency and stain-proofing property to the surface. The moiety A has one or two or more polyfluoropolyether chains P of the formula (1) at its end.

The polyfluoropolyether chain P has, as essential components, a total of not less than 7 fluoroether units of one kind or two or more kinds of $-CF_2CF_2CF_2O-$, $-CHFCF_2CF_2O-$, $-CHClCF_2CF_2O-$, $-CH_2CF_2CF_2O-$, $-CF(CF_3)CF_2O-$, $-CF_2CF_2O-$ and $-CF_2O-$.

It is important that the fluorine-containing polyfluoropolyether chain P of the formula (1) has not less than 7 fluoroether units mentioned above, thereby making it possible to impart surface sliding property, water- and oil-repellency and stain-proofing property.

It is particularly preferable that not less than 10, more preferably not less than 20 of the above-mentioned fluoroether units are contained, thereby making it possible to exhibit more excellent sliding property and improve stain-proofing property, particularly removability of stains containing oily component.

The number of fluoroether units in the polyfluoropolyether chain P exceeding 40 is not desirable because solubility in general purpose solvents is lowered, and transparency is lowered in applications requiring transparency. The number of fluoroether units is preferably not more than 35, further preferably not more than 30.

Particularly preferred is a continuous chain of 7 to 40 fluoroether units of $-CF_2CF_2CF_2O-$ alone, which makes it possible to remarkably modify a surface particularly from the viewpoint of sliding property and stain-proofing property.

In the formula (1), Rf is a fluorine-containing alkyl group having 1 to 10 carbon atoms. The number of carbon atoms is not more than 5, particularly not more than 3 from the viewpoint of good sliding property.

Examples of Rf are, for instance,

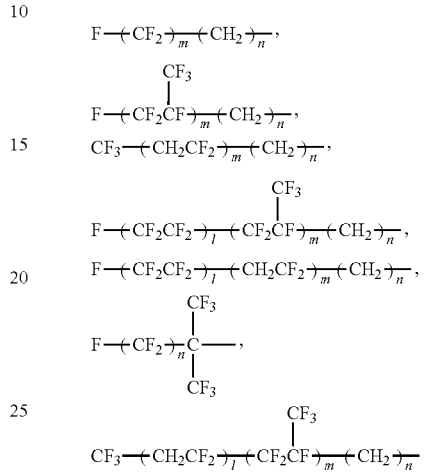

and the like, wherein l is an integer of from 1 to 10; m is an integer of from 1 to 10; n is 0 or an integer of from 1 to 5; the sum of carbon atoms does not exceed 10.

The moiety A may have not less than two polyfluoropolyether chains P. However if the number of chains is too many, solubility in general purpose solvents is lowered, and therefore, the number of chains is preferably 1 to 3, particularly one.

The moiety A is bonded to the ethylenic polymer moiety M preferably in the form of $(P)_p\text{-}(R^8)_q-$ as represented by the formula (1a):

$$(P)_p\text{-}(R^8)_q\text{-M} \qquad (1a)$$

wherein P is the polyfluoropolyether chain of the formula (1); $R^8$ is a di-, tri- or tetra-valent organic group; M is the ethylenic polymer moiety M; p is an integer of 1 to 3, preferably 1; q is 0 or 1.

$R^8$ is a di-, tri- or tetra-valent organic group which connects the polyfluoropolyether chain P with the ethylenic polymer moiety M, and is preferably a di-, tri- or tetra-valent hydrocarbon group which has 1 to 20 carbon atoms and may have hetero atom or chlorine atom.

Preferred examples of $(P)_p\text{-}(R^8)_q-$ are, for instance,

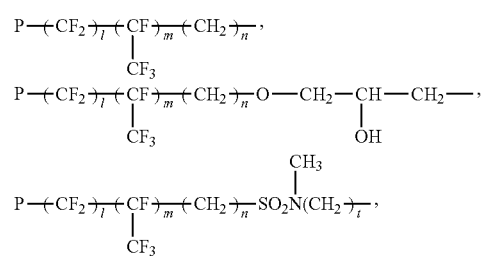

-continued

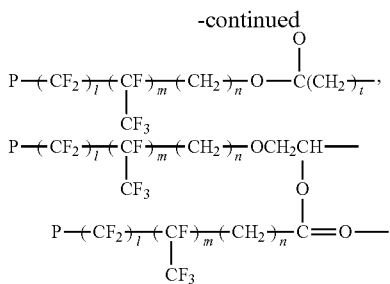

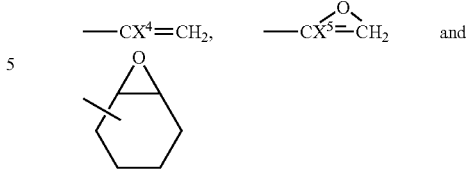

and the like, wherein l, m, n and t are the same or different and each is 0 or an integer of 1 to 5.

The moiety B does not have much effect on physical properties of the whole curable fluorine-containing resin (I) when the self-crosslinkable functional group Y contained in its structure is in an unreacted state. However after the crosslinking reaction, the moiety B makes the resin insoluble in solvents including general purpose solvents, and imparts, to a coating film formed on a surface to be modified, a high hardness not to cause deformation and damages of the coating film and further provides scratch resistance and abrasion resistance.

The self-crosslinkable functional group is a functional group being capable of causing crosslinking reaction between the same functional groups, and is specified by functions and properties thereof.

In the case of non-self-crosslinkable functional group, a curing agent is necessary for proceeding with curing (crosslinking) reaction. In that case, segregation of the unreacted curing agent having a relatively low molecular weight easily occurs on the surface of the coating film, and there is a case where an effect of surface modification is lowered. In this point, since the self-crosslinkable functional group does not necessitate a curing agent for the curing reaction, an effect of surface modification can be exhibited sufficiently.

In the present invention, neither of the case of causing crosslinking reaction of one self-crosslinkable functional group with other kind of self-crosslinkable functional group or non-self-crosslinkable functional group nor the case of crosslinking reaction through a crosslinking agent (curing agent) is excluded.

Examples of the self-crosslinkable functional group Y are, for instance, self-crosslinkable functional groups having radical polymerization reactivity, self-crosslinkable functional groups having cationic polymerization reactivity, self-crosslinkable functional groups crosslinking only with light, and the like.

Examples of the self-crosslinkable functional groups having radical polymerization reactivity are, for instance, C=C having radical polymerization reactivity and the like; examples of the self-crosslinkable functional groups having cationic polymerization reactivity are, for instance, C=C having cationic polymerization reactivity, epoxy group, oxetanyl group, crosslinkable silicon compounds such as alkoxysilyl group and silanol group and the like; and examples of the self-crosslinkable functional groups crosslinking only with light are, for instance, photo-dimerization functional groups such as vinylcinnamic acid and the like. In the present invention, preferred examples of the self-crosslinkable functional group Y are C=C having radical polymerization reactivity and epoxy group, and particularly preferred are:

wherein $X^4$ is H, $CH_3$ or F; $X^5$ is H or $CH_3$.

The self-crosslinkable functional group Y should be bonded to the end of the moiety B, and may be bonded directly to the ethylenic polymer moiety M as the moiety B or may be bonded to the ethylenic polymer moiety M through a di-, tri- or tetra-valent organic group. For example, the moiety B is bonded to the ethylenic polymer moiety M in the form of $(Y)_r-(R^9)_s-$ as represented by the formula (1b):

$$(Y)_r-(R^9)_s-M \tag{1b}$$

wherein Y is the self-crosslinkable functional group; $R^9$ is a di-, tri- or tetra-valent organic group; M is the ethylenic polymer moiety M; r is an integer of 1 to 3, preferably 1; s is 0 or 1.

$R^9$ is a di-, tri- or tetra-valent organic group connecting the self-crosslinkable functional group Y with the ethylenic polymer moiety M, and is preferably a di-, tri- or tetra-valent hydrocarbon group which has 1 to 20 carbon atoms and may have hetero atom or chlorine atom. Preferred examples of $(Y)_r-(R^9)_s-$ are, for instance,

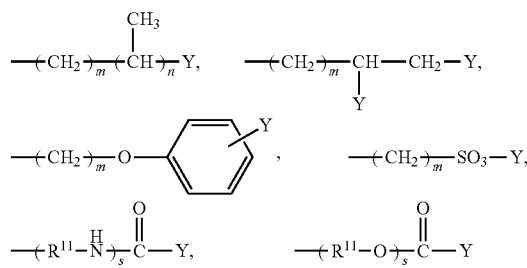

and the like, wherein $R^{11}$ is a divalent hydrocarbon group having 1 to 20 carbon atoms; m is 0 or an integer of 1 to 10; n is 0 or an integer of 1 to 5; s is 0 or 1.

Among them, from the viewpoint of high crosslinking reactivity, preferred examples of the combination of $R^9$ and Y are, for instance,

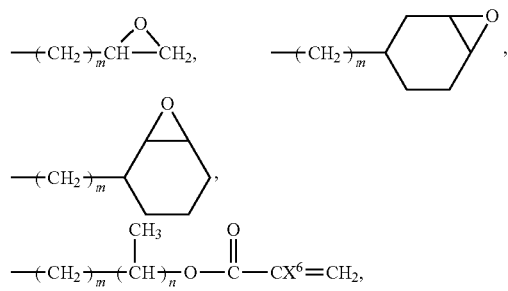

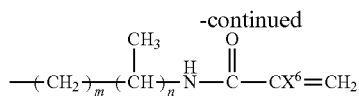

and the like, wherein $X^6$ is H, F or $CH_3$; m is 0 or an integer of 1 to 10; n is 0 or an integer of 1 to 5.

Preferred examples of the combination of $R^9$ and Y are more concretely:

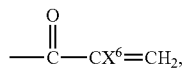
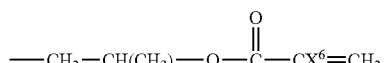
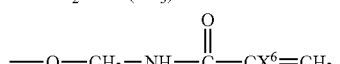
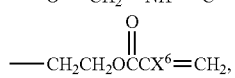
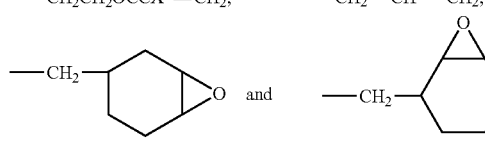
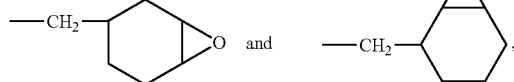

wherein $X^6$ is H, $CH_3$ or F.

The fluorine-containing polymer (IAB) having the self-crosslinkable functional group may have an other optional functional group on the ethylenic polymer moiety M in addition to the self-crosslinkable functional group Y as described in the explanation of the ethylenic polymer moiety M. Further the polymer (IAB) may have other optional functional groups on the moiety A and/or the moiety B. Examples of the other functional group are, for instance, hydroxyl, carboxyl, nitrile, amino, sulfonic acid group, alkylamino group, sulfonic acid ester group, isocyanate group, carboxylic acid anhydride group and the like.

In the fluorine-containing polymer (IAB) having the self-crosslinkable functional group, the combination of the ethylenic polymer moiety M, the moiety A and the moiety B may be selected, for example, in consideration of a balance of properties such as solubility in a solvent, sliding property, curability and storage stability.

Nonlimiting examples of preferred combination are, for instance, as follows.

(Combination 1)

M: 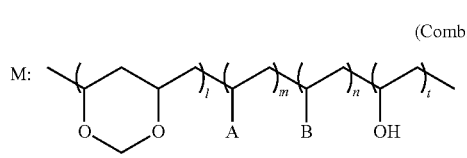

(l + m + n + t = 100% by mole)

A: 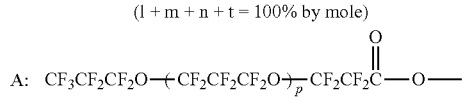

(p = 7 to 40)

B: 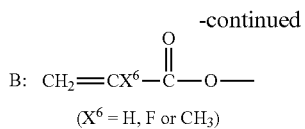

($X^6$ = H, F or $CH_3$)

(Combination 2)

M: 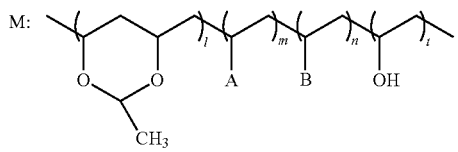

(l + m + n + t = 100% by mole)

A: 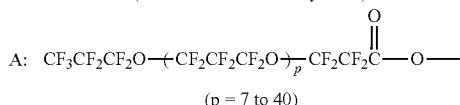

(p = 7 to 40)

B: 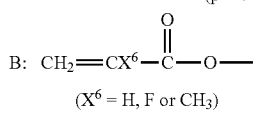

($X^6$ = H, F or $CH_3$)

(Combination 3)

M: 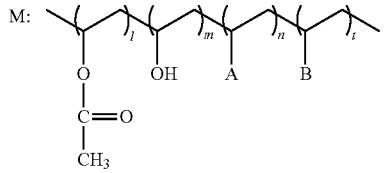

(l + m + n + t = 100% by mole)

A: 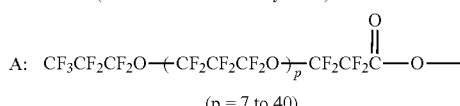

(p = 7 to 40)

B: 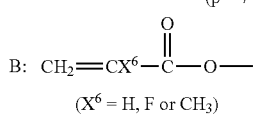

($X^6$ = H, F or $CH_3$)

(Combination 4)

M: 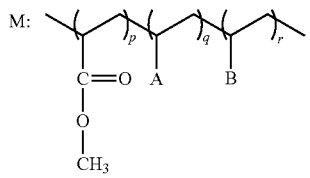

(p + q + r = 100% by mole)

A: 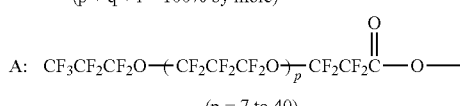

(p = 7 to 40)

B: 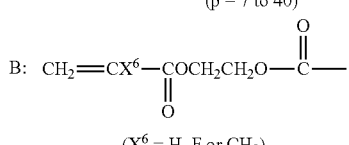

($X^6$ = H, F or $CH_3$)

(Combination 5)

M: 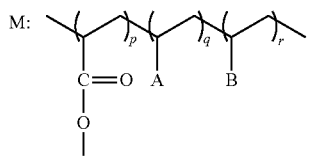

(p + q + r = 100% by mole)

-continued

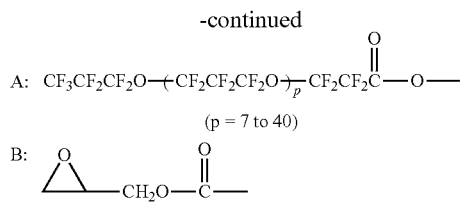

(p = 7 to 40)

B: 

Examples of the method of introducing the moieties A and B to the ethylenic polymer moiety M (the process for preparing the fluorine-containing polymer (IAB), in which at least a part of its side chain is replaced by the moieties A and B) are, for instance, (1) a method of, after preparing the ethylenic polymer moiety MP containing the ethylenic polymer moiety M, introducing the moiety A and then the moiety B to this ethylenic polymer moiety MP, (2) a method of, after preparing the ethylenic polymer moiety MP containing the ethylenic polymer moiety M, introducing the moiety B and then the moiety A to this ethylenic polymer moiety MP, (3) a method of, after preparing the ethylenic polymer moiety MP containing the ethylenic polymer moiety M, introducing the moiety A and the moiety B simultaneously to this ethylenic polymer moiety MP, and (4) a method of copolymerizing an ethylenic monomer having the moiety A with an ethylenic monomer having the moiety B.

In the methods (1) to (3) (polymer reaction methods) of preparing the ethylenic polymer moiety MP and then introducing the moiety A and the moiety B to this ethylenic polymer moiety MP, it is advantageous from the viewpoint of easy formation of the moieties that firstly a reactive functional group $T^1$ and a reactive functional group $T^2$ are introduced to the ethylenic polymer moiety MP and then the moieties A and B are introduced by reacting the group $T^1$ with a group $S^1$ and the group $T^2$ with a group $S^2$ by using a compound (A-a) for introducing the moiety A which has a reactive functional group $S^1$ reactable with the reactive functional group $T^1$ and is represented by:

$$(P)_p\text{-}(R^8)_q\text{—}S^1 \qquad (A\text{-}a)$$

wherein P, $R^8$, p and q are as defined in the formula (1a); $S^1$ is a reactive functional group reactable with the reactive functional group $T^1$ of the ethylenic polymer moiety MP and a compound (B-b) for introducing the moiety B which has a reactive functional group $S^2$ reactable with the reactive functional group $T^2$ and is represented by:

$$(Y)_r\text{-}(R^9)_s\text{—}S^2 \qquad (B\text{-}b)$$

wherein Y, $R^9$, r and s are as defined in the formula (1b); $S^2$ is a reactive functional group reactable with the reactive functional group $T^2$ of the ethylenic polymer moiety MP.

The reactive functional groups $T^1$ and $S^1$ and also the reactive functional groups $T^2$ and $S^2$ are functional groups being capable of reacting with each other, respectively and may be of the same kind or different kinds. $T^1$ and $T^2$ and also $S^1$ and $S^2$ may be of the same kind or different kinds, respectively.

Examples of the reactive functional groups for introducing the moieties A and B are, for instance, functional groups represented by:

—OH, —COOH, —NH$_2$, —COX$^7$, —NCO,
—SO$_2$Cl, —CH$_2$Cl, —CH$_2$Br, —CH$_2$I, —CHO,

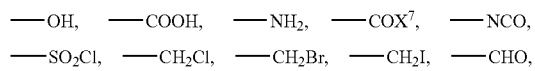, and —CH=CH$_2$, wherein $X^7$ is F, Cl or Br. Among them, the reactive functional groups being capable of reacting with each other may be selected.

Preferred combinations of the reactive functional groups T ($T^1$ and $T^2$) with S ($S^1$ and $S^2$) are, for instance, in the case of T=—OH, S is —NCO, —COF, —COOH, —CH$_2$Cl, —CH$_2$Br, —NH$_2$, —CH$_2$I, —CH=CH$_2$, —SO$_2$Cl or

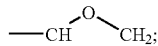

in the case of

T = 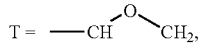

S is —OH, —COOH or —NH$_2$; in the case of T=—NH$_2$, S is —SO$_2$Cl, —NCO or —CHO; in the case of T=—COCl, S is —OH or —NH$_2$; in the case of T=—CH$_2$Cl, S is —COOH or —OH; and the like.

When $T^1$ of the ethylenic polymer MP is —OH, examples of the compound (A-a) for introducing the moiety A are, for instance, CF$_3$CF$_2$CF$_2$O—(CF$_2$CF$_2$CF$_2$O)$_n$CF$_2$CF$_2$COF,

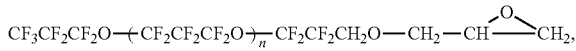

and the like, wherein n is 7 to 40. Among them, particularly preferred is CF$_3$CF$_2$CF$_2$O—(CF$_2$CF$_2$CF$_2$O)$_n$CF$_2$CF$_2$COF, wherein n is 7 to 40, from the viewpoint of good reactivity of polymer reaction.

Also, when $T^1$ of the ethylenic polymer MP is —COX$^7$, examples of the compound (A-a) for introducing the moiety A are, for instance, CF$_3$CF$_2$CF$_2$O—(CF$_2$CF$_2$CF$_2$O)$_n$CF$_2$CF$_2$CH$_2$OH, CF$_3$CF$_2$CF$_2$O—(CF$_2$CF$_2$CF$_2$O)$_n$—
CF$_2$CF$_2$CH$_2$OCH$_2$CH$_2$NH$_2$, CF$_3$CF$_2$CF$_2$O—(CF$_2$CF$_2$CF$_2$O)$_n$—
CF$_2$CF$_2$CH$_2$OCH$_2$CH$_2$OH, and the like, wherein n is 7 to 40. Among them, particularly preferred is CF$_3$CF$_2$CF$_2$O—(CF$_2$CF$_2$CF$_2$O)$_n$—CF$_2$CF$_2$CH$_2$OH, wherein n is 7 to 40, from the viewpoint of good reactivity of polymer reaction.

When $T^2$ of the ethylenic polymer MP is —OH, examples of the compound (B-b) for introducing the moiety B are, for instance, CH$_2$=CF—COF,    CH$_2$=CF—COCl, -continued

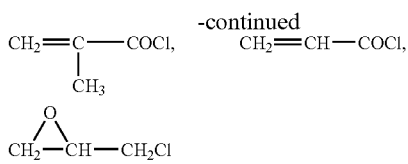

and the like. Among them, particularly preferred are:
CH$_2$=CF—COF and

from the viewpoint of good reactivity of polymer reaction and good curing reactivity.

Also, when T$^2$ of the ethylenic polymer MP is —COCl, examples of the compound (B-b) for introducing the moiety B are, for instance,

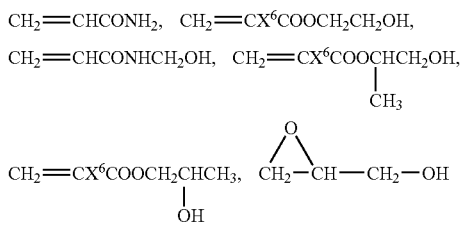

and the like, wherein X$^6$ is H, F or CH$_3$. Among them, particularly preferred are:

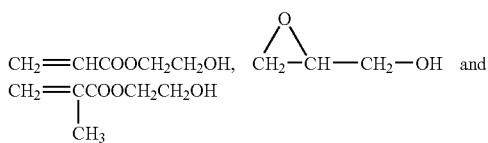

from the viewpoint of good curing reactivity.

The polymer reaction for introducing the moieties A and B can be carried out in the presence of, for example, pyridine, amine such as triethylamine or a strong base such as NaOH or KOH.

The polymer reaction can be carried out in the presence or absence of a solvent. The use of a solvent is more preferred since more homogeneous product can be obtained. When a solvent is used, kind of a solvent is not limited particularly, but a solvent having no fluorine is preferred. When the reactivity is insufficient, it is preferable to add a fluorine-containing solvent, for example, a fluorine-containing alcohol such as H—(CF$_2$CF$_2$)$_a$-CH$_2$OH (a is an integer of 1 to 3), CF$_3$—(CF$_2$) b—CH$_2$OH (b is an integer of 1 to 5) or CH(CF$_3$)$_2$OH; fluoroalkane such as CH$_3$CCl$_2$F, CF$_3$CF$_2$CHCl$_2$ or CClF$_2$CF$_2$CHClF; 1,3-bistrifluoromethyl benzene or benzotrifluoride in a ratio of 10 to 50% based on the whole solvents since the reactivity can be enhanced.

In the method (4) (copolymerization method) of introducing the moieties A and B at the same time that the ethylenic polymer moiety M is prepared, the ethylenic monomer (M-a) having the moiety A is copolymerized with the ethylenic monomer (M-b) having the moiety B.

The ethylenic monomer (M-a) having the moiety A is represented by the formula (M-a):

$$(P)_p\text{-}(R^8)_q\text{-}M^1 \qquad (M\text{-}a)$$

wherein P, R$^8$, p and q are as defined in the formula (1a); M$^1$ is an ethylenic reactive group providing the structural unit of the ethylenic polymer moiety M.

Examples thereof are, for instance,

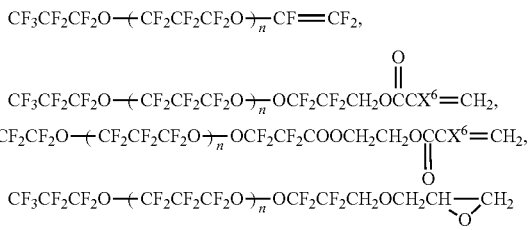

and the like, wherein X$^6$ is H, F or CH$_3$; n is 7 to 40.

The ethylenic monomer (M-b) having the moiety B is represented by the formula (M-b):

$$(Y)_r\text{-}(R^9)_s\text{-}M^2 \qquad (M\text{-}b)$$

wherein Y, R$^9$, r and s are as defined in the formula (1b); M$^2$ is an ethylenic reactive group providing the structural unit of the ethylenic polymer moiety M.

Examples thereof are, for instance,

and the like, wherein X$^6$ is H, F or CH$_3$.

Besides, examples of the copolymerizable monomer which may be copolymerized for forming the ethylenic polymer moiety M are, for instance,

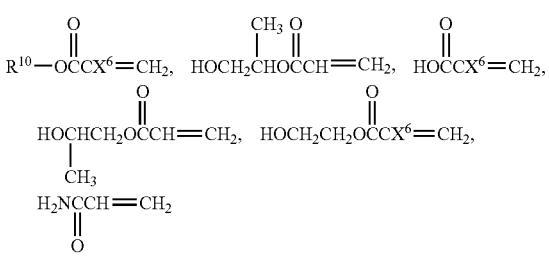

and the like, wherein X$^6$ is H, F or CH$_3$; R$^{10}$ is an alkyl group having 1 to 10 carbon atoms.

This copolymerization method can be carried out by usual radical polymerization method. The fluorine-containing polymer (IAB) having self-crosslinkable functional group can be prepared, for example, by copolymerization by using, as a polymerization initiator, an azo polymerization initiator such as azoisobutyronitrile (AIBN) or a peroxide polymerization initiator such as benzoyl peroxide.

In addition to the ethylenic monomers (M-a) and (M-b), other copolymerizable ethylenic monomer described in the explanation of the ethylenic polymer moiety M may be copolymerized.

In the curable fluorine-containing resin (I) used in the first of the present invention, etc., the moiety A and the moiety B should be present, and as mentioned supra, the resin may consist of the fluorine-containing polymer (IAB) having self-crosslinkable functional group or may be a mixture of the fluorine-containing polymer (IA) comprising the polymer moiety M and the moiety A and the fluorine-containing polymer (IB) comprising the polymer moiety M and the moiety B. Further the resin may be a mixture of the polymer (IAB) and the polymer (IA) and/or polymer (IB). Also the resin may contain the polymer MP other than the polymers (IAB), (IA) and (IB).

With respect to the fluorine-containing polymer (IA), the structure and preparation process thereof are the same as in the fluorine-containing polymer (IAB) except that the moiety B is not contained therein.

Nonlimiting examples of the preferred polymer (IA) are, for instance, fluorine-containing ethylenic polymers having, as the polymer moiety M, the structural unit represented by the formula (2):

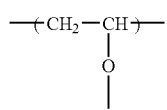

or the formula (3):

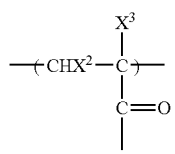

wherein $X^2$ is H or a bond; $X^3$ is H, F or $CH_3$, in which the moiety A is bonded to the ethylenic polymer moiety M in the form of $(P)_p$—$(R^8)_q$— as represented by the formula (1a):

$(P)_p$—$(R^8)_q$-M     (1a)

wherein P is the polyfluoropolyether chain of the formula (1); $R^8$ is a di-, tri- or tetra-valent organic group; M is the ethylenic polymer moiety M; p is an integer of 1 to 3, preferably 1; q is 0 or 1.

Particularly preferred polymer (IA) are, for example,

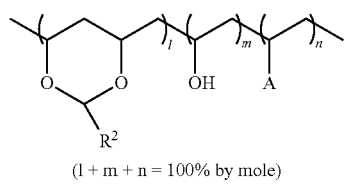

(l + m + n = 100% by mole)

-continued

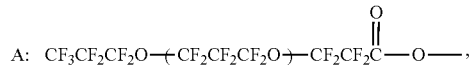

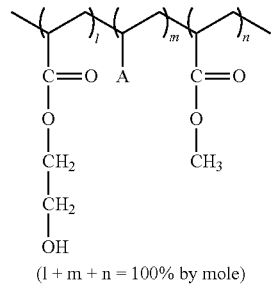

(l + m + n = 100% by mole)

and the like. This polymer (IA) is advantageous since a low refractive index and transparency in addition to surface sliding property and solubility in a solvent are given to the resin (I).

With respect to the fluorine-containing polymer (IB), the structure and preparation process thereof are the same as in the fluorine-containing polymer (IAB) except that the moiety A is not contained therein.

Nonlimiting examples of the preferred polymer (IB) are, for instance, fluorine-containing ethylenic polymers having, as the polymer moiety M, a structural unit represented by the formula (2):

or the formula (3):

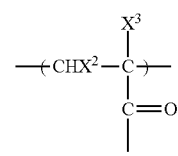

wherein $X^2$ is H or a bond; $X^3$ is H, F or $CH_3$, in which the moiety B is bonded to the ethylenic polymer moiety M in the form of $(Y)_r$—$(R^9)_s$— as represented by the formula (1b):

$(Y)_r$—$(R^9)_s$-M     (1b)

wherein Y is the self-crosslinkable functional group; $R^9$ is a di-, tri- or tetra-valent organic group; M is the ethylenic polymer moiety M; r is an integer of 1 to 3, preferably 1; s is 0 or 1.

Particularly preferred polymer (IB) are, for example,

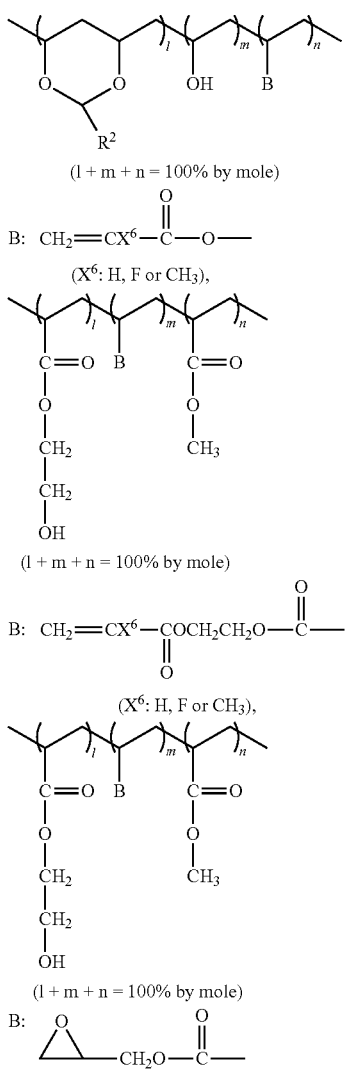

and the like. This polymer (IB) gives self-curability to the resin.

The other polymer MP is the ethylenic polymer MP having neither the moiety A nor the moiety B, and need be soluble in general purpose solvents.

The other polymer MP is not limited particularly as far as it is soluble in general purpose solvents. Nonlimiting examples thereof are, for instance, polyvinyl acetal, partly saponified polyvinyl alcohol, polyvinyl acetate, polymethyl methacrylate, polyhydroxy methacrylate and the like.

The moiety A, moiety B and polymer moiety M in the polymer (IAB), polymer (IA) and polymer (IB) may be the same or different. Also the moiety of the other polymer MP corresponding to the polymer moieties M of the polymers (IAB), (IA) and (IB) may be the same as or different from the polymer moieties M of the polymers (IAB), (IA) and (IB) except that the other polymer MP does not have the moieties A and B. When the moiety corresponding to the polymer moieties M is the same as the polymer moieties M, for example, in the case that the polymer reaction method explained above is employed as the preparation method of the polymer (IAB), the polymer MP is present in the resin (I) in the form of partly reacted product or unreacted polymer. It is a matter of course that a polymer having the moiety A, moiety B and polymer moiety M which are the same as or different from those of the polymer (IAB) or each of which is the same or different may be blended positively to the resin (I) for accomplishing the particular objects.

When the ethylenic polymer moieties M are the same or of the same kind (for example, in the case of using for applications requiring transparency), since compatibility of the polymer (IAB) with the other polymers ((IA), (IB) and MP) is good, a uniform coating film can be formed, which is preferable.

In order to impart other different property, a polymer having a polymer moiety M2 different from an ethylenic polymer moiety M1 of one polymer may be contained within a range not having an adverse effect on compatibility. The content of different polymer moiety M2 is preferably not more than 20% by weight, further preferably not more than 10% by weight, particularly preferably not more than 5% by weight based on the whole ethylenic polymer moieties M (M1+M2).

The contents of polymers (IAB), (IA), (IB) and MP in the resin (I) may be optionally adjusted depending on required characteristics (fluorine content, content of chain P, refractive index, etc.) of the resin (I) and kind and amounts of the moiety A, moiety B and polymer moiety M.

Then physical properties and characteristics of the resin (I) are explained below.

The number average molecular weight of the resin (I) is preferably not less than 100, further preferably not less than 300, particularly preferably not less than 500 from the viewpoint of good coatability and sliding property, and is preferably not more than 1,000,000, further preferably not more than 100,000, particularly preferably not more than 10,000 from the viewpoint of good solubility in a solvent and good storage stability.

The number average molecular weight is calculated from the data measured by gel permeation chromatography (GPC) by using GPC HLC-8020 available from Toso Kabushiki Kaisha and columns available from Shodex (one GPC KF-801, one GPC KF-802 and two GPC KF-806M were connected in series) and flowing tetrahydrofuran (THF) as a solvent at a flowing rate of 1 ml/min.

The fluorine content of resin (I) is preferably not less than 0.1% by weight, further preferably not less than 1% by weight, particularly preferably not less than 5% by weight from the viewpoint of good sliding property and stain-proofing property, and is preferably not more than 35% by weight, further preferably not more than 25% by weight, particularly preferably not more than 20% by weight from the viewpoint of good solubility in a solvent.

With respect to the content of polyfluoropolyether chain P, the chain P is contained in the resin (I) preferably in an amount of not less than 1% by weight, further not less than 5% by weight, especially not less than 10% by weight. An upper limit thereof is preferably 60% by weight, further preferably 50% by weight. If the content of polyfluoropolyether chain P is less than 1% by weight, an intended effect of enhancing sliding property of the resin (I) is not obtained. If the content exceeds 60% by weight, compatibility of the resin (I) is lowered, and when mixing the resin (I) with a solvent or other resin, white turbidity arises and further separation or precipitation occurs. In the case of aiming at improvement of water repellency and stain-proofing property, it is preferable that the polyfluoropolyether chain P is contained in an amount of not less than 10% by weight, and not more than 50% by weight in the fluorine-containing resin (I).

The content of self-crosslinkable functional group Y is preferably not less than 0.02 mole, further preferably not less than 0.1 mole, particularly preferably not less than 0.2 mole, and preferably not more than 100 mole, further preferably not more than 50 mole, particularly preferably not more than 20 mole per 1 kg of the resin (I). If the content of functional group Y is too small, curing reactivity and solvent resistance, scratch resistance and abrasion resistance after the curing are insufficient. On the contrary, if the content of functional group Y is too large, storage stability of the polymer, resin and further surface treating agent is lowered.

In the curable fluorine-containing resin (I), the refractive index thereof can be lowered to, for example, not more than 1.48, and depending on the composition of the resin, the refractive index can be decreased to not more than 1.45.

The resin (I) used in the present invention can be used for the curable compositions for surface modification of the fourth and fifth inventions explained infra in detail, and in addition, when used alone or used by mixing additive thereto, can modify a surface of a substrate as a surface modifier by using as it is or dissolving it in a solvent and then coating on the substrate (the second invention).

The resin (I) is featured particularly by being soluble in general purpose solvents, and therefore, a solvent-based surface modifier obtained by dissolving the resin in a solvent is preferred since coatability is good, a uniform and homogeneous thin film can be formed, productivity is high and production can be carried out at low cost.

The solvent is not limited particularly as far as the resin (I) can be uniformly dissolved therein. Examples thereof are, for instance, non-fluorine-containing general purpose solvents such as ketone solvents, ester solvents such as acetic acid ester solvents, alcohol solvents, propylene glycol solvents, cellosolve solvents, aromatic hydrocarbons, aliphatic hydrocarbons, ether solvents, acetal solvents, turpentine oil, a solvent mixture of the same kind or different kinds thereof and further a solvent mixture containing such a solvent.

Examples of the ketone solvents are, for instance, acetone, methyl ethyl ketone (MEK), methyl butyl ketone (MBK), methyl isobutyl ketone (MIBK), 2-hexanone, cyclohexanone, methylamino ketone, 2-heptanone and the like. Particularly preferred are MIBK, MEK and MBK.

Examples of the acetic acid ester solvents are, for instance, ethyl acetate, butyl acetate, isobutyl acetate, propyl acetate, amyl acetate and the like. Particularly preferred are propyl acetate, butyl acetate and isobutyl acetate.

Examples of the alcohol solvents are, for instance, methyl alcohol, ethyl alcohol, n-propyl alcohol, isopropyl alcohol, n-butyl alcohol, isobutyl alcohol, isopentyl alcohol and the like. Particularly preferred are isopropyl alcohol and isopentyl alcohol.

Examples of the ester solvents other than the acetic acid ester solvents are, for instance, ethyl butyrate, butyl butyrate, methyl lactate, ethyl lactate, methyl 3-methoxypropionate, ethyl 3-methoxypropionate, methyl 2-hydroxyisobutyrate, ethyl 2-hydroxyisobutyrate, diethyl oxalate, ethyl pyruvate, ethyl-2-hydroxybutyrate, ethyl acetoacetate and the like.

Examples of the propylene glycol solvents are, for instance, propylene glycol monomethylether, propylene glycol monoethylether, propylene glycol monobutylether, propylene glycol monomethylether acetate, propylene glycol monoethylether acetate, propylene glycol monobutylether acetate, dipropylene glycol dimethyl ether and the like.

Examples of the cellosolve solvents are, for instance, methyl cellosolve, ethyl cellosolve, methyl cellosolve acetate, ethyl cellosolve acetate and the like.

Examples of the aromatic hydrocarbons are, for instance, toluene, xylene and the like.

Examples of the aliphatic hydrocarbons are, for instance, industrial gasoline, hexane, octane and the like.

Examples of the ether solvents are, for instance, tetrahydrofuran (THF), dioxane, methyl butyl ether and the like.

Examples of the acetal solvents are, for instance, dimethoxymethane, diethoxymethane and the like.

Particularly preferred is at least one solvent selected from ketone solvents, acetic acid ester solvents and alcohol solvents or a solvent mixture containing at least one of these solvents from the viewpoint of good solubility and relatively small influence on a human body and environment.

In the solvent-based surface modifier of the first invention, the amount of solvent is optionally selected depending on kind of polymer contained in the resin (I), kind of other solid to be dissolved, an amount of a curing agent, kind of a substrate to be coated and an intended coating thickness and also depending on whether or not a curing agent is used. The solvent is used preferably in such an amount that a concentration of the whole solids is not less than 0.01% by weight, further not less than 0.1% by weight, and not more than 20% by weight, further not more than 10% by weight.

To the surface modifier of the first invention may be added various additives as case demands, as far as the intended effect of the present invention is not lowered.

Examples of the additives are, for instance, a curing agent (crosslinking agent) other than an active energy curing initiator mentioned infra, leveling agent, viscosity controller, photo-stabilizer, moisture absorbing agent, pigment, dye, reinforcing agent, antistatic agent and the like.

Preferred as the curing agent (crosslinking agent) other than an active energy curing initiator are, for example, those having at least one radically or cationically reactive functional group, and concretely there are radically polymerizable monomers such as acrylic monomers and cationically polymerizable monomers such as epoxy monomers or glycidyl monomers. Those monomers may be either of unifunctional or polyfunctional monomers.

For the coating in the case of solvent-based surface modifier, there can be used, for example, a roll coat method, gravure coat method, micro gravure coat method, flow coat method, bar coat method, spray coat method, die coat method, spin coat method, dip coat method and the like. Also in the case of powder surface modifier (a fluorine-containing resin (I) alone or a composition comprising the resin (I) and other resin), for example, a powder coating method, flame spray coating method or the like can be used, and the coating method may be selected from those coating methods in consideration of kind and shape of a substrate, productivity, etc.

The curing method is not limited particularly. When the curing agent (crosslinking agent) is used, curing reaction may be initiated at a curing initiation temperature or under curing conditions, or when the curing agent is not blended, curing may be carried out under the conditions for causing self-crosslinking by the self-crosslinkable functional group (heating to 50° to 150° or allowing to stand at room temperature).

Kind of a substrate is not limited particularly. Examples thereof are, for instance, inorganic materials such as glass, stone, concrete and tile; synthetic resins such as polyolefin resins such as polyethylene and polystyrene; acrylic resins such as polymethyl methacrylate, polyester resins such as polyarylate and polyethylene terephthalate, cellulose resins such as triacetyl cellulose, rubber resins such as rubber hydrochloride, vinyl chloride resin, polycarbonate resin, phenol resin, xylene resin, urea resin, melamine resin, diallyl phthalate resin, furan resin, polyamide resin, polyimide resin, alkyd resin, polyurethane resin, vinyl ester resin, polysulfone resin and ionomer resin; metals such as iron, aluminum and copper; wood, paper, printed matter, printing paper and picture; the mentioned substrates on which a protection film such as a hard coat layer, an antistatic film or an antireflection film is formed; and a photo-recording medium, magnetic recording medium and those media on which a hard coat layer, an antireflection film, a film absorbing specific wavelength light or the like is formed. When the surface modifier of the present invention is applied on those substrates, surface sliding property, scratch resistance, water- and oil-repelling property and stain-proofing property thereof can be enhanced.

The surface modifier of the present invention is applied preferably on resin substrates such as acrylic resin, polycarbonate resin, cellulose resin, polyester resin (for example, polyethylene terephthalate or the like), polyolefin resin or those resin substrates on which an antireflection film is formed.

Particularly since a refractive index of the resin (I) is low, when the resin is applied directly on an antireflection film, sliding property and stain-proofing property can be imparted effectively without lowering reflection reducing performance.

There are known antireflection films, for example, antireflection films formed by deposition of an inorganic substance such as magnesium fluoride ($MgF_2$), silicon oxide ($SiO_2$) or the like, silicone polymer antireflection films (JP2000-17028A, JP2000-313709A, etc.), fluorine-containing polymer antireflection films (WO02/18457, JP6-115023A, JP2000-194503A, JP11-337706A, etc.), porous antireflection films (JP11-281802A, JP4-163248A, etc.) and the like. In the present invention, too, the surface modifier can be applied on the mentioned antireflection films. The surface modifier of the present invention is advantageous particularly when applied to thin (about 0.03 to 0.5 μm) fluorine-containing polymer antireflection films which are excellent in transparency, high in productivity and good in reflection reducing effect, but have relatively large abrasion resistance and are desired to have enhanced scratch resistance and surface hardness.

Namely, the multi-layered antireflection film (the third invention) comprising an antireflection film and a cured film of the surface modifier can be formed by using the surface modifier of the first invention. The cured film of the surface modifier may be formed as a continuous film or discontinuous films in the form of island directly on the antireflection film. The coating thickness is preferably within a range of from a monomolecular film (about 0.2 to 0.3 nm) to a thickness of not more than 500 nm, further preferably not more than 50 nm because an adverse effect on optical characteristics is small. A coating amount in a weight of the resin (I) is not less than 0.5 mg/m$^2$, preferably not less than 1 mg/m$^2$, and not more than 100 mg/m$^2$, preferably not more than 50 mg/m$^2$. If the coating amount is too small, effects on sliding property and abrasion resistance tend to be insufficient, and too large coating amount tends to have an undesirable influence on a reflection reducing effect.

The surface modifier of the present invention, when formed into a thin film, is excellent in sliding property, is high in durability, is low in a refractive index and is transparent, and therefore, is preferred as a surface modifier for displays and many various kinds of products raised infra.

The fourth of the present invention relates to the composition for surface modification which is curable with active energy rays and comprises:
  (a) the above-mentioned curable fluorine-containing resin
    (I) being soluble in general purpose solvents, and
  (b) an active energy curing initiator.

In the case of the active energy curable composition for surface modification of the fourth invention, crosslinking (curing) reaction can be initiated easily with active energy rays, heating at high temperature is not necessary unlike other crosslinking systems, and crosslinking (curing) reaction can be carried out at relatively low temperature in a short period of time. Therefore, the active energy curable composition is preferred since it is applicable to substrates, for example, transparent resin substrates which have low heat resistance and are easily subject to deformation, decomposition and coloration by heating.

The curable fluorine-containing resin (I) used as the component (a) in the fourth invention is the resin (I) used in the first invention. Preferred polymers (IAB), (IA), (IB) and MP and resin (I) and examples thereof are as raised in the explanation of the polymers and resin (I) in the first invention, and therefore explanation thereof are omitted.

The active energy curing initiator as the component (b) is a compound generating radical or cation by irradiation of active energy rays such as electromagnetic wave having a wavelength of not more than 350 nm such as ultraviolet ray, X-ray and γ-ray or electron beam. The generated radical or cation functions to initiate the crosslinking (curing) reaction of the crosslinkable functional group Y.

The active energy curing initiator (b) is optionally selected depending on kind of crosslinkable group (whether the group is radically reactive or cationically reactive) in the curable fluorine-containing resin (I) as the component (a), kind (wavelength range) of active energy rays, intensity of irradiation, and the like.

In the fourth invention, preferred examples of the crosslinkable functional group Y of the polymers (IAB) and (IB) in relation with the active energy curing initiator (b) are the same as in the first invention. For example, there are self-crosslinkable functional groups having radical polymerization reactivity and self-crosslinkable functional groups having cationic polymerization reactivity.

Examples of the self-crosslinkable functional groups having radical polymerization reactivity are, for instance, C=C having radical polymerization reactivity, and examples of the self-crosslinkable functional groups having cationic polymerization reactivity are, for instance, C=C having cationic polymerization reactivity, epoxy group, oxetanyl group, and in addition crosslinkable silicon compounds such as alkoxysilyl group and silanol group.

Preferred examples of the self-crosslinkable functional group Y in the present invention are C=C having radical polymerization reactivity and epoxy group, and particularly preferred are:

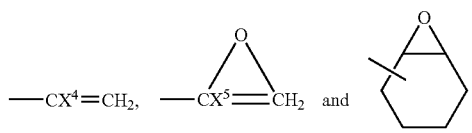

wherein $X^4$ is H, $CH_3$ or F; $X^5$ is H or $CH_3$. Those functional groups easily initiate the crosslinking reaction with radical or cation generated from the active energy curing initiator (b).

Examples of the initiator for crosslinking (curing) of the fluorine-containing polymers (IAB) and (IB) having a carbon-carbon double bond having radical polymerization reactivity as the self-crosslinkable functional group Y by using active energy rays in an ultraviolet region are, for instance, as follows.

Acetophenone Initiators

Acetophenone, chloroacetophenone, diethoxyacetophenone, hydroxyacetophenone, α-aminoacetophenone, hydroxypropiophenone, 2-methyl-1[4-(methylthio)phenyl]-2-morphorinopropane-1-one, 1-hydroxycyclohexyl phenyl ketone and the like.

Benzoin Initiators

Benzoin, benzoin methyl ether, benzoin ethyl ether, benzoin isopropyl ether, benzoin isobutyl ether, benzyldimethylketal and the like.

Benzophenone Initiators

Benzophenone, benzoylbenzoic acid, methylo-benzoylbenzoate, 4-phenylbenzophenone, hydroxybenzophenone, hydroxy-propylbenzophenone, acrylated benzophenone, Michler's ketone and the like.

Thioxanthone Initiators

Thioxanthone, chlorothioxanthone, methylthioxanthone, diethylthioxanthone, dimethylthioxanthone and the like.

Other Initiators

Benzyl, α-acyloxime ester, acylphosphine oxide, glyoxyester, 3-ketocoumaran, 2-ethylanthraquinone, camphorquinone, anthraquinone and the like.

Also examples of the initiator for crosslinking (curing) of the fluorine-containing polymers (IAB) and (IB) having a carbon-carbon double bond having cationic polymerization reactivity, epoxy group or oxacyclopropanyl group as the self-crosslinkable functional group Y by using active energy rays in an ultraviolet region are, for instance, as follows.

Onium Salts

Iodonium salt, sulfonium salt, phosphonium salt, diazonium salt, ammonium salt, pyridinium salt and the like.

Metallocene Compounds

Iron-arene complex and the like.

Sulfone Compounds

β-keto ester, β-sulfonyl sulfone, α-diazo compounds thereof and the like.

Sulfonic Acid Esters

Alkyl sulfonate, haloalkyl sulfonate, aryl sulfonate, imino sulfonate and the like.

Others

Sulfonimide compounds, diazomethane compounds and the like.

Among those initiators, iodonium salts, sulfonium salts, diazonium salts and metallocene compounds are preferred. Further preferred is at least one aromatic compound selected from the group consisting of aromatic diazonium salts, aromatic sulfonium salts, aromatic iodonium salts and metallocene compounds. Those compounds are preferred since cation species which initiate cationic polymerization are generated at high quantum efficiency by irradiation of light.

Depending on kind of the polymer constituting the fluorine-containing resin (I) or kind of the active energy curing initiator (b), there is a case where compatibility between them is inferior, and white turbidity arises on the composition itself or. the film after the coating, which lowers transparency and curing reactivity. Therefore it is desirable that the combination of the resin with the initiator is selected in consideration of this point.

An amount of the active energy curing initiator (b) is not less than 0.001 equivalent, further not less than 0.005 equivalent, especially not less than 0.01 equivalent, and not more than 1 equivalent, further not more than 0.5 equivalent, especially not more than 0.1 equivalent based on 1 equivalent of the crosslinkable functional group Y. If the amount of initiator (b) is too small, there is a tendency that curability is lowered and the film lacks strength and hardness. If the amount of initiator (b) is too large, sliding property tends to be lowered and a refractive index tends to be increased.

To the composition of the fourth invention may be added an another curing agent and additives as case demands. The another curing agent and additives which are exemplified in the first invention can be used in the fourth invention.

The composition of the fourth invention can be prepared by mixing the components (a) and (b) with another curing agent and additives, or by further mixing with a solvent for dissolving or dispersing. It is preferable to use a solvent dissolving the resin (I). Such a composition prepared by using a solvent in which the resin (I) is soluble is explained as the next fifth invention.

Examples of the solvent other than the solvents used in the fifth invention mentioned infra are ester solvents other than acetic acid ester solvents exemplified in the first invention, propylene glycol solvents, cellosolve solvents, aromatic hydrocarbons, aliphatic hydrocarbons, ether solvents, acetal solvents, turpentine oil, a solvent mixture of the same kind or different kinds thereof and further a non-fluorine-containing solvent mixture containing such a solvent. The amount of solvent is optionally selected depending on kind of the polymer constituting the resin (I), kind of the other solid to be dissolved, an amount of a curing agent, kind of a substrate to be coated and an intended coating thickness and also depending on whether or not a curing agent is used. The solvent is used preferably in such an amount that the concentration of the whole solids is not less than 0.01% by weight, further not less than 0.1% by weight, and not more than 20% by weight, further not more than 10% by weight.

For the coating, the same coating methods as in the first invention can be employed.

The crosslinking (curing) of the coating film formed by applying the composition of the fourth invention is explained in the fifth invention.

The fifth invention relates to the composition for surface modification which is crosslinkable with active energy rays and comprises:
  (a) the curable fluorine-containing resin (I) being soluble in general purpose solvents,
  (b) an active energy curing initiator, and
  (c) at least one general purpose solvent selected from the group consisting of ketone solvents, acetic acid ester solvents and alcohol solvents or a solvent mixture containing the general purpose solvent.

As mentioned above, the fifth invention relates to the composition obtained by adding the specific solvent (c) to the composition of the fourth invention.

The specific solvent (c) is at least one general purpose solvent selected from the group consisting of ketone solvents, acetic acid ester solvents and alcohol solvents or a solvent mixture containing such a general purpose solvent. With respect to ketone solvents, acetic acid ester solvents and alcohol solvents, the same solvents explained in the first invention can be used.

Examples of the other solvent which may be mixed with ketone solvents, acetic acid ester solvents and alcohol solvents are ester solvents other than acetic acid ester solvents explained in the first and fourth inventions, propylene glycol solvents, cellosolve solvents, aromatic hydrocarbons, aliphatic hydrocarbons, ether solvents, acetal solvents, turpentine oil and the like. In the case of solvent mixtures, it is preferable, from the viewpoint of enhancement of solubility of the resin (I), that the amount of ketone solvent, acetic acid ester solvent or alcohol solvent is not less than 10% by volume, further preferably not less than 30% by volume, particularly preferably not less than 50% by volume based on the whole solvent mixture.

The composition of the fifth invention can be prepared by adding the resin component (a) and the active energy curing initiator (b) to the solvent (c) and at least dissolving the resin (I). Other additives, concentration and coating method are the same as in the fourth invention.

A surface of a substrate can be modified by applying the curable composition for surface modification of the fourth or fifth invention on the substrate, drying the composition and then irradiating the obtained coating film with active energy rays for curing.

An irradiation amount of active energy ray is not less than 100 mJ/cm$^2$U, preferably about 500 mJ/cm$^2$U, for example, in the case of ultraviolet irradiation with a high pressure mercury lamp.

By the irradiation of active energy rays, the active energy curing initiator (b) generates radical or cation, and the self-crosslinkable functional groups Y of the fluorine-containing polymers (IAB) and (IB) undergo polymerization and crosslinking between the polymer molecules. As a result, a film hardness is increased, a mechanical strength is enhanced and abrasion resistance and scratch resistance are enhanced. Further the composition becomes insoluble not only in a solvent in which the composition is soluble before the curing but also in many other kinds of solvents, and durability is enhanced. Also even after the irradiation of active energy rays, excellent sliding property given by the curable fluorine-containing resin (I) can be maintained.

A preferred thickness of the coating film obtained by applying the surface modifier on various substrates and then curing is not limited particularly. The thickness is preferably not less than 0.5 nm, further preferably not less than 1 nm, and preferably not more than 500 nm, further preferably not more than 50 nm. If the coating thickness is thick, there is a case where coloration by interference of visible light arises. In order to prevent this, a refractive index of the substrate may be made equal to a refractive index of the surface modifier composition.

Kind of the substrate is not limited particularly, and there are raised the same substrates as exemplified in the first invention. The composition is applied preferably on resin substrates such as acrylic resin, polycarbonate resin, cellulose resin, polyester resin (for example, polyethylene terephthalate or the like) and polyolefin resin and on antireflection films formed on those resin substrates.

Especially the resin (I) is low in a refractive index, and therefore by applying the composition directly on an antireflection film, sliding property and stain-proofing property can be given effectively without lowering reflection reducing performance.

An antireflection film is formed by using the above-mentioned silicone polymer antireflection film material, fluorine-containing polymer antireflection film material, porous antireflection film material or the like, and is excellent particularly in transparency and has good reflection reducing effect. It is advantageous that the composition is applied on a thin (about 0.03 to 0.5 μm) fluorine-containing polymer anti-reflection film which has a relatively large friction resistance and is desired to have enhanced scratch resistance and surface hardness.

Namely, there can be formed a multi-layered antireflection film comprising an antireflection film and a coating film of the surface modifier or curable composition for surface modification by using the curable composition for surface modification of the fourth or fifth invention. The coating film of surface modifier may be formed on the antireflection film as a continuous film or a discontinuous film in the form of island. When coating on an antireflection film, in order not to have an adverse effect on optical characteristics, the coating thickness is preferably as thin as possible within a range of sufficiently obtaining effect of sliding property and stain-proofing property. The coating thickness after the curing is preferably not more than 50 nm, further preferably not more than 20 nm. A lower limit of the coating thickness is a monomolecular film (about 0.2 to 0.3 nm), further 0.5 nm, especially 1 nm.

A coating amount in a weight of the resin component (a) is not less than 0.5 mg/m$^2$, preferably not less than 1 mg/m$^2$, and not more than 100 mg/m$^2$, preferably not more than 50 mg/m$^2$. If the amount is too small, there is a tendency that an effect on sliding property and abrasion resistance becomes insufficient, and too large amount tends to have an undesirable influence on a reflection reducing effect.

The curable composition for surface modification of the present invention is excellent in sliding property of a film, is high in durability, is low in a refractive index and is transparent when formed into a thin film like the surface modifier of the first invention. Therefore, the composition is effectively applied on the following products such as displays.

1. Display-related Products (1) Display

Displays such as CRT (TV set and personal computer monitor), liquid crystal display, plasma display, organic EL display, inorganic thin film EL dot matrix display, rear projection display, fluorescent character display tube (VFD), FED (Field Emission Display), protection panels therefor, and those displays and panels having an antireflection film on surfaces thereof (2) Components of Liquid Crystal Display Components of liquid crystal display such as front light and diffusion sheet, and those components having an antireflection film on surfaces thereof (3) Various Filters Optical filters which are mounted on a personal computer monitor for enhancement of visibility, and touch panels for PC, PDA and ATM machine (world-wide called touch sensor or touch screen), and those filters and touch panels having an antireflection film on surfaces thereof 2. Optical Parts and Optical Devices Optical parts and optical devices such as lens for glasses, prism, lens sheet, pellicle film, deflection panel, optical filter, lenticular lens, Fresnel lens, screen of rear projection display, optical fiber, optical coupler, and those optical parts and optical devices having an antireflection film on surfaces thereof 3. Building Materials Transparent glass or plastic (acrylic resin, polycarbonate resin and the like) building materials represented by show window, show case, cover for advertisement, cover for photo stand, windshield of car and those materials having an anti-reflection film on surfaces thereof 4. Recording Media-related Products (1) Photo-recording Media Photo-recording media represented by photo-magnetic disc, photo discs such as CD, LD and DVD, phase transition photo disc such as PD and hologram recording, and those photo-recording media having an antireflection film on surfaces thereof (2) Magnetic Recording Media Magnetic recording media such as magnetic tape, magnetic disc, magnetic drum and magnetic flexible disc, and those magnetic recording media having an antireflection film on surfaces thereof A sheet or film formed by using the curable composition for surface modification of the present invention can be suitably used for adhering to the above-exemplified various products or for adhering as the outermost surface thereof. In this case, surface modification of the products can be easily carried out, and scrapping or recycling of the products is easy.

The above-mentioned sheet or film can be formed, for example, by applying the curable composition for surface modification of the present invention on the substrates explained in the first invention by various coating methods mentioned supra and then curing the coating film. It is preferable that the substrate is one having an antireflection film on a surface thereof.

It is explained above that properties such as stain-proofing property and water- and oil-repellency in addition to high sliding property are given to a substrate (or an antireflection film) by over-coating the substrate with the resin (I) having both of the polyfluoropolyether chain P and the self-crosslinkable functional group Y by the mentioned coating method.

However especially in the case of cheap antireflection films, there is a case where the over-coating is difficult from the viewpoint of cost. In such a case, it is advantageous to add a polymer having surface modifying ability to a curable antireflection film material and carry out formation of an antireflection film and surface modification by one coat.

The present inventors have found that when admixing to a curable antireflection film material, since the polymer is confined to a certain extent in the antireflection film by curing of the antireflection film material, a crosslinkable reactive group is not always necessary, and have completed the sixth invention.

Namely, the sixth invention relates to the antireflection film obtained by applying, on a substrate, the composition for forming the antireflection film which comprises:

(d) the fluorine-containing resin (II) which comprises the fluorine-containing ethylenic polymer (IAB) or the fluorine-containing ethylenic polymer (IA), is soluble in general purpose solvents and has a fluorine content of not less than 1% by weight and not more than 35% by weight, and (e) an antireflection film material.

The resin (II) admixed to the antireflection film material is the same as the resin (I) except that the resin (II) may have or may not have the moiety B (self-crosslinkable functional group Y), namely, the resin (II) may contain or may not contain the polymer (IB), and has a fluorine content of not less than 1% by weight and not more than 35% by weight.

Namely, the resin (II) at least contains the polymer (IAB) or the polymer (IA). The polymer (IB) and the other polymer MP may be contained or may not be contained in the resin (II).

It is preferable that the fluorine content of resin (II) is not less than 1% by weight, further preferably not less than 5% by weight, particularly preferably not less than 10% by weight, from the point of decreasing a refractive index and enhancing sliding property and further stain-proofing property. Also it is preferable that the fluorine content of resin (II) is not more than 35% by weight, further preferably not more than 25% by weight, particularly preferably not more than 20% by weight, from the viewpoint of good solubility in a solvent and excellent transparency.

Also it is preferable that the resin (II) has a refractive index of not more than 1.48, more preferably not more than 1.45 not to have an adverse effect on optical characteristics of the antireflection film.

The antireflection film material of the component (e) is one which can be applied in the liquid form on a substrate (film or the like). Examples thereof are known antireflection film materials, for example, antireflection film materials comprising organosilicon compound material, fluorine-containing organosilicon compound material, crosslinkable silicone resin material, crosslinkable fluorine-containing silicone resin material, fluorine-containing acryl compound material, fluorine-containing epoxy compound material or curable fluorine-containing polymer material. To the antireflection film material (e) may be mixed a curing agent, leveling agent, viscosity controller, photo-stabilizer, moisture absorbing agent, pigment, dye, reinforcing agent and the like.

Nonlimiting examples of the organosilicon compound material are, for instance, curable resin compositions having siloxane bond which are disclosed in JP10-147740A, JP2000-1648A, etc.

Nonlimiting examples of the fluorine-containing organosilicon compound material are, for instance, compositions for forming an antireflection film comprising a silane compound which are disclosed in JP10-147739A, JP2000-10965A, JP2000-17028A, etc.

Nonlimiting examples of the fluorine-containing acryl compound material are, for instance, compositions comprising a polyfunctional fluorine-containing acryl which are disclosed in JP9-203801A, JP2000-194503A, etc.

Nonlimiting examples of the fluorine-containing epoxy compound material are, for instance, compositions comprising a polyfunctional fluorine-containing epoxy compound which are disclosed in JP5-302058A, JP2000-17099A, etc.

Nonlimiting examples of the curable fluorine-containing polymer material are the fluorine-containing polymer (IIINC) used in the seventh invention explained infra, and in addition, for example, those disclosed in JP11-337706A, etc.

In the composition for forming an antireflection film which is used in the sixth invention, an adding amount of the resin (II) component (d) varies depending on kinds of the resin component (d) and antireflection film material, required properties, etc. The amount is not less than 1% by weight, further not less than 5% by weight, especially not less than 10% by weight based on the whole solid content. If the amount is too small, surface modification effect is not exhibited.

This composition for forming an antireflection film is advantageous because when dissolved or dispersed in various solvents, the composition can be applied to various substrates and a coating film can be formed, and after the formation of the coating film, crosslinking (curing) can be carried out efficiently by irradiation of active energy rays, thus making it possible to obtain a cured film.

In addition to the same non-fluorine-containing solvents as exemplified in the first invention, there can be used fluorine-containing solvents, too. An amount and kind of the solvent may be optionally selected from the examples raised supra depending on intended coatability, film forming property, uniformity of a coating thickness and productivity in coating.

Particularly preferred are solvents selected from ketone solvents, acetic acid ester solvents and alcohol solvents. Preferred as the fluorine-containing solvent are, for instance, fluorine-containing alcohols such as H—$(CF_2CF_2)_a$—$CH_2OH$ (a is an integer of 1 to 3), $CF_3$—$(CF_2)_b$—$CH_2OH$ (b is an integer of 1 to 5) and $CH(CF_3)_2OH$; fluoro alkanes such as $CH_3CCl_2F$, $CF_3CF_2CHCl_2$ and $CClF_2CF_2CHClF$; 1,3-bis-trifluoromethylbenzene, benzotrifluoride and the like.

In the sixth invention, when the solvent is used, a preferred solid content of the composition for forming an antireflection film varies depending on kinds of the resin component (d) and antireflection film material to be added, required properties, etc. The solid content is preferably not less than 0.01% by weight, further preferably not less than 0.1% by weight, particularly preferably not less than 1% by weight, and preferably not more than 20% by weight, further preferably not more than 10% by weight.

A refractive index of a cured article (coating film) after the application and curing of this composition for forming an antireflection film is preferably not more than 1.45, further preferably not more than 1.42, particularly preferably not more than 1.40, most preferably not more than 1.38. A lower refractive index is advantageous from the point that an excellent reflection reducing effect is exhibited.

A preferred coating thickness of the antireflection film of the sixth invention varies depending on refractive indices of the coating film and a substrate. The coating thickness of the antireflection film is preferably not less than 0.03 μm, further preferably not less than 0.07 μm, particularly preferably not less than 0.08 μm, and preferably not more than 0.5 μm, further preferably not more than 0.2 μm, particularly preferably not more than 0.12 μm. If the coating thickness is too thin, reduction of a reflectance by interference of visible light is insufficient, and on the other hand, if the coating thickness is too thick, the reflectance nearly depends on only reflection on an interface between the air and the film, and therefore, reduction of a reflectance by interference of visible light tends to be insufficient. It is particularly preferable to set the coating thickness so that a wavelength showing a minimum reflectance of a product after providing an antireflection film thereon is within a range of usually from 420 to 720 nm, further from 520 to 620 nm.

For coating of the composition for forming an antireflection film, the same substrates (except those on which an antireflection film is formed) as explained in the first invention can be used in the sixth invention, too.

It is preferable that the substrate is one having a hard coat layer, a layer having a high refractive index, an antistatic layer or the like on a surface thereof and the composition for forming an antireflection film is applied thereon (outermost surface).

As a hard coat layer, there can be used a usual acrylic resin hard coat for optical use, melamine resin, and hybrid with inorganic material represented by acryl silicone hybrid coat or the like. The hard coat layer is not limited thereto.

Nonlimiting examples of the layer having a high refractive index are acryl silicone hybrid coat and an acryl resin in which inorganic fine particles are dispersed. A layer having a high refractive index of not less than 1.58 is preferred because a minimum reflectance of not more than 1% is easily realized.

The antistatic layer may be one formed by sputtering method or combined with a hard coat layer or the like.

A hard coat layer, a layer having a high refractive index and an antistatic layer may be formed alone on a substrate, or a combination of a plurality of the respective layers may be applied on a substrate. It is a matter of course that one layer being capable of covering those functions may be employed.

Also an outermost layer having a thickness of not more than 0.05 μm may be further formed on the so-formed antireflection film. Preferred as an outermost layer are a stainproofing layer which can prevent adhesion of oily substances or dusts or makes it possible to easily wipe them off, a lubricating layer which can decrease scratching and a combination of those layers. For the outermost layer, preferred are materials having perfluoropolyether structure and functional group which have good adhesion to the antireflection film.

The antireflection film of the sixth invention, when formed into a thin film, is excellent in sliding property, is high in durability, is low in a refractive index and is transparent like the surface modifier of the first invention. Therefore, the use of the film is effective when the film is formed on the following products such as displays.

1. Display-related Products (1) Display

Displays such as CRT (TV set and personal computer monitor), liquid crystal display, plasma display, organic EL display, inorganic thin film EL dot matrix display, rear projection display, fluorescent character display tube (VFD), FED (Field Emission Display) and protection panels therefor (2) Components of Liquid Crystal Display Components of liquid crystal display such as front light and diffusion sheet (3) Various Filters Optical filters which are mounted on a personal computer monitor for enhancement of visibility, and touch panels for PC, PDA, ATM machine (world-wide called touch sensor or touch screen)

2. Optical Parts and Optical Devices

Optical parts and optical devices such as lens for glasses, prism, lens sheet, pellicle film, deflection panel, optical filter, lenticular lens, Fresnel lens, screen of rear projection display, optical fiber and optical coupler 3. Building Materials Transparent glass or plastic (acrylic resin, polycarbonate resin and the like) building materials represented by show window, show case, cover for advertisement, cover for photo stand and windshield of car 4. Recording Media (1) Photo-recording Media Photo-recording media represented by photo-magnetic disc, photo discs such as CD, LD and DVD, phase transition photo discs such as PD and hologram recording (2) Magnetic Recording Media Magnetic recording media such as magnetic tape, magnetic disc, magnetic drum and magnetic flexible disc A sheet or film formed by using the composition for forming an antireflection film of the sixth invention can be suitably used for adhering to the above-exemplified various products or for adhering as the outermost surface thereof. In this case, an antireflection film can be easily formed, and scrapping or recycling of the products is easy.

The above-mentioned sheet or film can be obtained, for example, by applying the composition for forming an antireflection film of the sixth invention on the substrate explained in the first invention by various coating methods mentioned supra and then curing the coating film.

The antireflection film of the sixth invention is advantageous from the viewpoint of workability, productivity and cost because a step for providing a surface modifying layer is not necessary.

The seventh invention relates to the curable resin composition suitable for the composition for forming an antireflection film of the sixth invention.

Namely, the seventh invention relates to the curable resin composition comprising:

(1) a curable fluorine-containing resin (III) comprising a fluorine-containing polymer (IIINC) which has a number average molecular weight of 500 to 1,000,000 and is represented by the formula (4):

$$—(N)—(C)— \quad (4)$$

wherein the structural unit N is a structural unit derived from a fluorine-containing ethylenic monomer and represented by the formula (N):

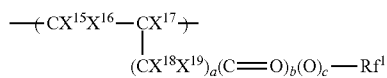

(N)

in which $X^{15}$ and $X^{16}$ are the same or different and each is H or F; $X^{17}$ is H, F, $CH_3$ or $CF_3$; $X^{18}$ and $X^{19}$ are the same or different and each is H, F or $CF_3$; $Rf^1$ is an organic group in which 1 to 3 $Y^1$ or $Y^2$ ($Y^1$ is a monovalent organic group having 2 to 10 carbon atoms and an ethylenic carbon-carbon double bond at its end and $Y^2$ is a monovalent organic group having 2 to 100 carbon atoms and 1 to 5 crosslinkable cyclic ether structures, in which hydrogen atoms may be replaced by fluorine atoms) are bonded to a fluorine-containing alkyl group having 1 to 40 carbon atoms or a fluorine-containing alkyl group having 2 to 100 carbon atoms and ether bond; a is 0 or an integer of from 1 to 3; b and c are the same or different and each is 0 or 1, the structural unit C is a structural unit derived from a monomer copolymerizable with the fluorine-containing ethylenic monomer providing the structural unit N, and the structural units N and C are contained in amounts of from 0.1 to 100% by mole and from 0 to 99.9% by mole, respectively, and (2) the fluorine-containing resin (II) mentioned supra.

The resin (II) and suitable examples thereof explained in the sixth invention can be used as the fluorine-containing resin (II) of the seventh invention.

The fluorine-containing polymer (IIINC) is featured by having, as the organic group Rf1 which is an end group of a side chain of the structural unit N of the formula (N), an organic group in which 1 to 3 $Y^1$ or $Y^2$ ($Y^1$ is a monovalent organic group having 2 to 10 carbon atoms and an ethylenic carbon-carbon double bond at its end and $Y^2$ is a monovalent organic group having 2 to 100 carbon atoms and 1 to 5 crosslinkable cyclic ether structures, in which hydrogen atoms may be replaced by fluorine atoms) are bonded to a fluorine-containing alkyl group having 1 to 40 carbon atoms or a fluorine-containing alkyl group having 2 to 100 carbon atoms and ether bond.

The ethylenic carbon-carbon double bond of the organic group $Y^1$ in $Rf^1$ and the crosslinkable cyclic ether structure of the organic group $Y^2$ in $Rf^1$ are both self-crosslinkable functional groups and active energy crosslinkable functional groups.

Preferred examples of the polymer (IIINC) are, for instance, fluorine-containing polymers, in which the structural unit N in the formula (N) is a structural unit N1 derived from a fluorine-containing ethylenic monomer and represented by the formula (N1):

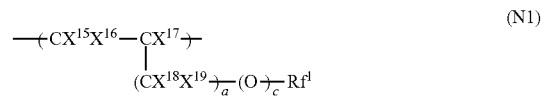

(N1)

wherein $X^{15}$, $X^{16}$, $X^{17}$, $X^{18}$, $X^{19}$, $Rf^1$, a and c are as defined above;

particularly a fluorine-containing polymer, in which the structural unit N in the formula (N) is a structural unit N2 derived from a fluorine-containing ethylenic monomer and represented by the formula (N2):

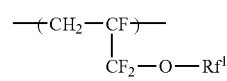

(N2)

wherein $Rf^1$ is as defined above; or a fluorine-containing polymer, in which the structural unit N in the formula (N) is a structural unit N3 derived from a fluorine-containing ethylenic monomer and represented by the formula (N3):

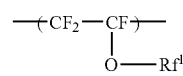

(N3)

wherein $Rf^1$ is as defined above.

It is further preferable that in the formulae (N), (N1), (N2) and (N3), at least one of the organic groups $Y^1$ or the organic groups $Y^2$ in $Rf^1$ is bonded to an end of $Rf^1$.

The fluorine-containing polymer (IIINC) having the organic group $Y^1$ having an ethylenic carbon-carbon double bond at its end (hereinafter referred to as "polymer (IIINC-1)") was developed by the present inventors and is publicly known (for example, WO02/018457, WO02/072706, WO02/093249). The fluorine-containing polymers having crosslinkable functional group which are disclosed in those patent publications can be used in the seventh invention, too.

Preferred examples of the polymer (IIINC-1) are, for instance:

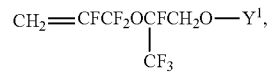

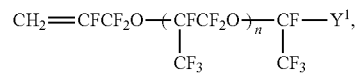

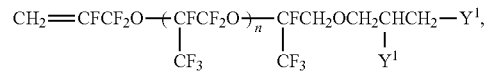

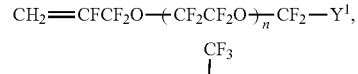

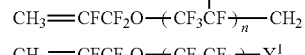

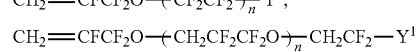

and the like, wherein n is an integer of from 1 to 30.

Among them, particularly preferred are:

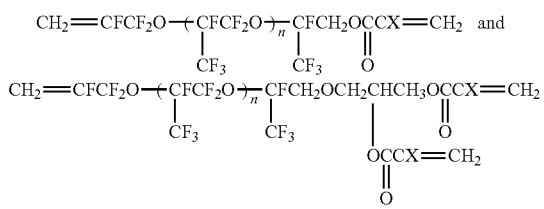

(X is H, F, CH$_3$ or CF$_3$; n is an integer of from 1 to 4) because those polymers are advantageous from the viewpoint of a low refractive index, curing reactivity and solubility in a solvent.

The fluorine-containing polymer (IIINC) having the organic group Y$^2$ having crosslinkable cyclic ether structure (hereinafter referred to as "polymer (IIINC-2)") is a novel polymer found out by the present inventors of which patent application was already filed (JP2002-235924A). The fluorine-containing polymer having crosslinkable functional group which is disclosed in the above-mentioned patent application can be used in the seventh invention, too.

Preferred examples of the polymer (IIINC-2) are polymers having the same basic structure as that of the polymer (IIINC-1), in which the organic group Y$^2$ is a monovalent organic group having 2 to 100 carbon atoms and 1 to 5 crosslinkable cyclic ether structures of 3- to 6-membered ring having at least one ether bond, in which hydrogen atom may be replaced by fluorine atom.

Examples of the organic group Y$^2$ are, for instance, an organic group having 2 to 100 carbon atoms and 1 to 5 of:

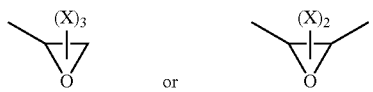

wherein X are the same or different and each is hydrogen atom, fluorine atom, an alkyl group having 1 to 6 carbon atoms or a fluorine-containing alkyl group having 1 to 6 carbon atoms, an organic group having 3 to 100 carbon atoms and 1 to 5 of:

wherein Q is a monovalent or divalent organic group of monocyclic, polycyclic or heterocyclic structure having 3 to 100 carbon atoms, in which hydrogen atom of Q may be replaced by the mentioned X, and an organic group having 3 to 100 carbon atoms and 1 to 5 of:

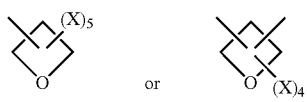

wherein X are the same or different and each is hydrogen atom, fluorine atom, an alkyl group having 1 to 6 carbon atoms or a fluorine-containing alkyl group having 1 to 6 carbon atoms.

Examples of the polymer (IIINC-2) are, for instance,

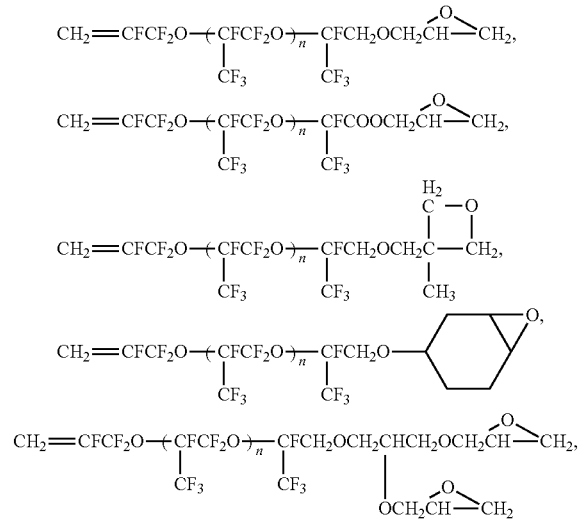

and the like, wherein n is 0 or an integer of 1 to 30.

Among them, preferred are $$CH_2=CFCF_2O-(CFCF_2O)_{\overline{n}}-CFCH_2OCH_2CH\overset{O}{-}CH_2 \text{ and}$$
$$\quad\quad\quad\quad\quad\quad\quad\quad\quad\quad\quad\quad | \quad\quad\quad |$$
$$\quad\quad\quad\quad\quad\quad\quad\quad\quad\quad\quad\quad CF_3 \quad\quad CF_3$$

$$CH_2=CFCF_2O-(CFCF_2O)_{\overline{n}}-CFCH_2OCH_2CH_2\overset{H_2C-O}{\underset{|}{C}-CH_2},$$
$$\quad\quad\quad\quad\quad\quad\quad\quad\quad\quad\quad\quad | \quad\quad\quad | \quad\quad\quad |$$
$$\quad\quad\quad\quad\quad\quad\quad\quad\quad\quad\quad\quad CF_3 \quad\quad CF_3 \quad\quad CH_3$$

wherein n is 0 or an integer of 1 to 4, because the polymers are advantageous from the viewpoint of a low refractive index, curing reactivity and solubility in a solvent.

The organic group Rf$^1$ may have both of Y$^1$ and Y$^2$, and the polymer (IIINC) may have both of Rf$^1$ having Y$^1$ and Rf$^1$ having Y$^2$.

The structural unit C is derived from a monomer copolymerizable with the fluorine-containing ethylenic monomer providing the structural unit N and is an optional component.

Preferred structural unit C is one which has the same basic structure as that of the structural unit (N) and has an organic group Z (Z is —OH, —CH$_2$OH, —COOH, carboxylic acid derivative, —SO$_3$H or cyano group) instead of the organic group Y$^1$. Examples thereof are the same as the preferred structures of the structural unit (N) of the polymer (IIINC), in which Y$^1$ is replaced by Z.

Other examples of the structural unit C are:

CF$_2$=CF$_2$, CF$_2$=CH$_2$, CF$_2$=CFCl, CF$_2$=CFCF$_3$,

-continued

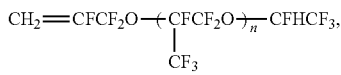

(n is 0 or an integer of 1 to 10)

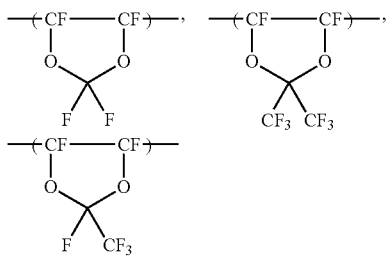

and the like, but the structural unit C is not limited to them.

The resin (III) may comprise the polymer (IIINC) alone or may contain an another polymer depending on purposes. This resin (III) is a transparent polymer having a refractive index of not more than 1.45, further not more than 1.42, particularly not more than 1.40, and has excellent properties as an optical material.

The amount of the resin (II) having surface modifying ability is preferably not less than 0.1 part by weight, further preferably not less than 1 part by weight, particularly preferably not less than 10 parts by weight, and preferably not more than 50 parts by weight, further preferably not more than 30 parts by weight based on 100 parts by weight of the resin (III). If the amount of resin (II) is too large, there is a case where optical characteristics such as a refractive index and transparency are adversely influenced. If the amount of resin (II) is too small, desirable effects such as surface sliding property, stain-proofing property and water- and oil-repellency are difficult to be exhibited.

For mixing the resins (II) and (III), there can be adopted a method of dissolving the resins (II) and (III) in a solvent to make a uniform solution; a method of making the respective aqueous dispersions of resins (II) and (III) and then mixing the dispersions; a method of kneading the resins in the form of solid; a method of forming the resins into powders and then mixing the powders; and the like method.

The curable resin composition of the seventh invention is useful not only as the composition for forming an antireflection film of the sixth invention but also as materials for a composition for hard coat for plastic lens; a composition for bathochromic treatment of fiber surface; a composition for hard coat of surfaces of packaging film, paper, resin and wood; a composition for a surface protection film of printed matters; and the like.

The present invention further relates to the method of forming a cured article, particularly an antireflection film (the eighth invention) which comprises coating the liquid composition comprising:

(i) the antireflection film material (e) used in the sixth invention or the curable fluorine-containing resin (III) used in the seventh invention, (ii) the fluorine-containing resin (II) which is used in the sixth invention and is soluble in general purpose solvents, and (iii) a solvent;

drying to form a coating film; and then curing the coating film.

Namely, in the eighth invention, the composition for forming an antireflection film which is used in the sixth invention or the curable resin composition of the seventh invention is formed into a liquid composition by using a solvent. As the solvent to be used, there can be preferably used non-fluorine-containing organic solvents exemplified in the first invention and also fluorine-containing organic solvents explained in the sixth invention. The solid concentration of the liquid composition is not limited particularly, and is preferably not less than 0.01% by weight, further preferably not less than 0.1% by weight, particularly preferably not less than 1% by weight, and preferably not more than 20% by weight, further preferably not more than 10% by weight.

This liquid composition is applied to a substrate. In the eighth invention, too, the coating methods and kinds of substrates explained supra can be also used.

Then the formed coating film is dried to remove the solvent therefrom. The drying is carried out by optionally selecting drying conditions which do not cause denaturation of the resin component and other mixed compounds.

This dried coating film is then cured to obtain a cured article. The optimum curing method may be selected by a person skilled in the art from conventional methods depending on curing reactivity of the curable resin. As case demands, the coating film may be subjected to curing by irradiation of active energy rays or by known curing method (peroxide crosslinking, or the like) by blending various curing agents.

The so-obtained cured article is useful as various cured articles, for example, antireflection films explained in the sixth and seventh inventions and further as hard coat for plastic lens; deep color fiber; hard coat of surfaces of packaging film, paper, resin and wood; a surface protection film of printed matters; and the like, and can exhibit excellent function particularly as an antireflection film.

The present invention is then explained by means of examples and preparation examples, but is not limited to them.

In the following Preparation Examples, Examples and Comparative Examples, equipment and measuring conditions used for evaluation of physical properties such as content are as follows.

(1) NMR: available from BRUKER CO., LTD.

Measuring conditions of $^1$H-NMR: 300 MHz (tetramethylsilane=0 ppm)

Measuring conditions of $^{19}$F-NMR: 282 MHz (trichlorofluoromethane=0 ppm)

An acetalization ratio (1.1 to 1.3 ppm (3H), 4.6 to 5.1 ppm (1H)) and a ratio of $CH_2$=CF—C(=O)—(αfluoroacryloyl) (5.2 to 5.8 ppm (2H)) are calculated from the data of $^1$H-NMR by usual method, and ratios of αfluoroacryloyl group (-116 to -118 ppm (1F)) and the chain P (-83 ppm (107F) and -129 ppm (54F)) are calculated from the data of $^{19}$F-NMR by usual method.

(2) IR analysis: Measuring is carried out at room temperature with a Fourier-transform infrared spectrophotometer 1 760X available from Perkin Elmer Co., Ltd.

PREPARATION EXAMPLE 1

Acetalization of PVA

Into a 200 ml four neck flask equipped with a reflux condenser, thermometer, stirrer and dropping funnel were poured 50 ml of dioxane, 5 ml of water, 10 g of polyvinyl alcohol (PVA: number average molecular weight of 500) and 4 g of concentrated hydrochloric acid, and then 3.3 g of acetaldehyde was added thereto dropwise with stirring. After stirring at room temperature over 10 hours, the reaction solution was poured into a sodium bicarbonate solution, and the precipitated solid was washed with water and then subjected to vacuum drying to obtain 9.3 g of colorless transparent acetalized PVA (acetalization ratio: 66% by mole).

PREPARATION EXAMPLE 2

Acetalization of PVA

An acetalized PVA (acetalization ratio: 95% by mole) was synthesized in the same manner as in Preparation Example 1 except that 5.0 g of acetaldehyde was used.

EXAMPLE 1

Preparation of Resin (I)

Into a 100 ml four neck flask equipped with a reflux condenser, thermometer, stirrer and dropping funnel were poured 20 ml of dioxane, 2.0 g of the acetalized PVA prepared in Preparation Example 1 and 1.0 g of pyridine, followed by sufficiently stirring for dissolution. Then thereto was added dropwise over about 10 minutes a solution prepared by dissolving 0.5 g of $CH_2=CFCOF$ for introducing the moiety B in 5 ml of diethyl ether. After completion of the addition, stirring was further continued for about three hours. Then thereto was added dropwise over about 15 minutes a solution obtained by dissolving, in 10 ml of HCFC-225, 0.2 g of perfluoropolyether carboxylic acid fluoride:

$$CF_3CF_2CF_2O(CF_2CF_2CF_2O)_nCF_2CF_2COF \qquad (n\approx 26)$$

having a number average molecular weight of 4,600 for introducing the moiety A. After completion of the addition, the stirring was continued for about three hours. To the dioxane solution after termination of the reaction was added 20 ml of diethyl ether, and the resultant solution was poured into the dropping funnel, followed by washing with water, 2% hydrochloric acid solution and then water and drying with anhydrous magnesium sulfate. Then anhydrous magnesium sulfate was removed by filtration. Ether was distilled off from this ether solution and a reaction product was taken out.

The obtained reaction product was dissolved in acetone-d$^6$, followed by measurement with $^{19}$F-NMR and $^1$H-NMR. From the result of the measurements, the product was found to be the resin (I) having the composition shown in Table 1. Obtained physical properties are contents (% by mole) of the moieties A and B, OH content (% by mole), content of the chain P (% by weight) and fluorine content (% by weight). Since the polymer MP was PVA, the fluorine content of the polymer moiety M was 0% by weight.

Further a solubility test and measurement of a refractive index were carried out by the methods mentioned below. The results are shown in Table 1.

(Solubility Test)

To 3 g each of methyl isobutyl ketone (MIBK), methyl ethyl ketone (MEK), propyl acetate, isopropyl alcohol (IPA) and a 1/1 (weight ratio) solvent mixture of MIBK and dioxane is added 0.1 g of a reaction product (solute). When the reaction product is dissolved completely, it is regarded as "soluble", and when even a part of the reaction product remains undissolved, it is regarded as "insoluble".

(Refractive Index)

A reaction product is cast in a Petri dish to form a film, and a refractive index ($n^D$) at 589 nm is measured using an Abbe's refractometer 2T available from Atago Co., Ltd.

EXAMPLE 2

Preparation of Resin (IA)

Into a 100 ml four neck flask equipped with a reflux condenser, thermometer, stirrer and dropping funnel were poured 20 ml of dioxane, 2.0 g of the acetalized PVA prepared in Preparation Example 1 and 0.5 g of pyridine, followed by sufficiently stirring for dissolution. Then thereto was added dropwise over about 15 minutes a solution prepared by dissolving, in 10 ml of HCFC-225, 1.6 g of perfluoropolyether carboxylic acid fluoride:

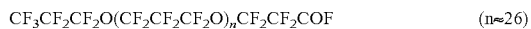
$$CF_3CF_2CF_2O(CF_2CF_2CF_2O)_nCF_2CF_2COF \qquad (n\approx 26)$$

having a number average molecular weight of 4,600 for introducing the moiety A. After completion of the addition, the stirring was further continued for about three hours. After termination of the reaction, the obtained dioxane solution was poured into water and the precipitated solid was washed with water and again dissolved in dioxane. This dioxane solution was poured into water and the precipitated solid was subjected to vacuum drying to obtain a colorless transparent reaction product.

The obtained reaction product was dissolved in acetone-d$^6$, followed by measurement with $^{19}$F-NMR and $^1$H-NMR. From the result of the measurements, the product was found to be the resin (IA) having the composition shown in Table 1.

A solubility test and measurement of a refractive index were carried out in the same manner as in Example 1. The results are shown in Table 1.

EXAMPLE 3

Preparation of Resin (I)

Into a 50 ml four neck flask equipped with a reflux condenser, thermometer, stirrer and dropping funnel were poured 10 ml of diethyl ether, 1.0 g of the fluorine-containing polymer having perfluoropolyether structure prepared in Example 2 and 0.5 g of pyridine, followed by sufficiently stirring for dissolution. Then thereto was added dropwise over about 10 minutes a solution prepared by dissolving 1.2 g of $CH_2=CFCOF$ for introducing the moiety B in 5 ml of diethyl ether. After completion of the addition, stirring was further continued for about three hours. After termination of the reaction, the resultant ether solution was poured into the dropping funnel, followed by washing with water, 2% hydrochloric acid solution and then water and drying with anhydrous magnesium sulfate. Then the ether solution was separated by filtration. Ether was distilled off from this ether solution and a reaction product was taken out.

The obtained reaction product was dissolved in acetone-d$^6$, followed by measurement with $^{19}$F-NMR and $^1$H-NMR.

From the result of the measurements, the product was found to be the resin (I) having the composition shown in Table 1.

A solubility test and measurement of a refractive index were carried out in the same manner as in Example 1. The results are shown in Table 1.

EXAMPLE 4

Preparation of Resin (I)

A reaction product (diethyl ether solution) was prepared in the same manner as in Example 1 except that the acetalized PVA prepared in Preparation Example 2 was used instead of the acetalized PVA prepared in Preparation Example 1 and 0.8 g of perfluoropolyether carboxylic acid fluoride:

$CF_3CF_2CF_2O(CF_2CF_2CF_2O)_nCF_2CF_2COF$ (n≈26)

for introducing the moiety A was used.

The obtained reaction product was dissolved in acetone-$d^6$, followed by measurement with $^{19}F$-NMR and $^1H$-NMR. From the result of the measurements, the product was found to be the resin (I) having the composition shown in Table 1.

A solubility test and measurement of a refractive index were carried out in the same manner as in Example 1. The results are shown in Table 1.

PREPARATION EXAMPLE 3

Formal Formation of PVA

Into a 200 ml four neck flask equipped with a reflux condenser, thermometer, stirrer and dropping funnel were poured 30 ml of water, 5 ml of methanol, 10 g of PVA and 4 g of concentrated sulfuric acid, and thereto was added dropwise 29 g of 35% aqueous solution of formaldehyde with stirring. After 48-hour stirring at room temperature, the resultant reaction solution was poured into a sodium bicarbonate solution and the precipitated solid was washed with water and was subjected to vacuum drying to obtain 8.9 g of colorless transparent PVA subjected to formal formation (formal formation ratio: 41%).

PREPARATION EXAMPLE 4

Formal Formation of PVA

A PVA subjected to formal formation (formal formation ratio: 80%) was synthesized in the same manner as in Preparation Example 3 except that a solvent mixture comprising 20 ml of dioxane and 2 ml of water was used as a solvent.

EXAMPLE 5

Preparation of Resin (I)

A reaction product (diethyl ether solution) was prepared in the same manner as in Example 1 except that the PVA subjected to formal formation which was prepared in Preparation Example 3 was used instead of the acetalized PVA prepared in Preparation Example 1 and 1.0 g of $CH_2$=CFCOF for introducing the moiety B was used.

The obtained reaction product was dissolved in acetone-$d^6$, followed by measurement with $^{19}F$-NMR and $^1H$-NMR. From the result of the measurements, the product was found to be the resin (I) having the composition shown in Table 1.

A solubility test and measurement of a refractive index were carried out in the same manner as in Example 1. The results are shown in Table 1.

EXAMPLE 6

Preparation of Resin (IA)

A reaction product was prepared in the same manner as in Example 2 except that the PVA subjected to formal formation which was prepared in Preparation Example 3 was used instead of the acetalized PVA prepared in Preparation Example 1.

The obtained reaction product was dissolved in acetone-$d^6$, followed by measurement with $^{19}F$-NMR and $^1H$-NMR. From the result of the measurements, the product was found to be the resin (IA) having the composition shown in Table 1.

A solubility test and measurement of a refractive index were carried out in the same manner as in Example 1. The results are shown in Table 1.

EXAMPLE 7

Preparation of Resin (I)

A reaction product (diethyl ether solution) was prepared in the same manner as in Example 3 except that the resin (IA) prepared in Example 6 was used instead of the resin (IA) prepared in Example 2 and 1.0 g of $CH_2$=CFCOF for introducing the moiety B was used.

The obtained reaction product was dissolved in acetone-$d^6$, followed by measurement with $^{19}F$-NMR and $^1H$-NMR. From the result of the measurements, the product was found to be the resin (I) having the composition shown in Table 1.

A solubility test and measurement of a refractive index were carried out in the same manner as in Example 1. The results are shown in Table 1.

EXAMPLE 8

Preparation of Resin (I)

A reaction product (diethyl ether solution) was prepared in the same manner as in Example 1 except that the PVA subjected to formal formation which was prepared in Preparation Example 4 was used instead of the acetalized PVA prepared in Preparation Example 1.

The obtained reaction product was dissolved in acetone-$d^6$, followed by measurement with $^{19}F$-NMR and $^1H$-NMR. From the result of the measurements, the product was found to be the resin (I) having the composition shown in Table 1.

A solubility test and measurement of a refractive index were carried out in the same manner as in Example 1. The results are shown in Table 1.

COMPARATIVE EXPERIMENTAL EXAMPLE 1

A solubility test was carried out in the same manner as in Example 1 by using perfluoropolyether:

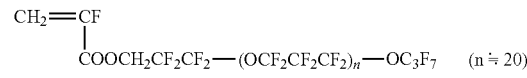

having crosslinkable group. The results are shown in Table 1.

TABLE 1

| | Example | | | | |
|---|---|---|---|---|---|
| | 1 | 2 | 3 | 4 | 5 |
| Composition of resin | | | | | |
| PVA | Prep. Ex. 1 | Prep. Ex. 1 | Prep. Ex. 1 | Prep. Ex. 2 | Prep. Ex. 3 |
| Acetalization ratio (% by mole) | 66 | 66 | 66 | 95 | — |
| Formal formation ratio (% by mole) | — | — | — | — | 41 |
| Moiety A content (% by mole) | 0.01 | 1.03 | 1.03 | 0.30 | 0.05 |
| Moiety B content (% by mole) | 2.39 | 0 | 31.97 | 4.7 | 16.95 |
| OH content (% by mole) | 31.6 | 33.07 | 1 | 0 | 42 |
| Chain P content (% by weight) | 1 | 39 | 39 | 20 | 4 |
| Fluorine content (% by weight) | | | | | |
| in ethylenic polymer moiety M | 0 | 0 | 0 | 0 | 0 |
| in resin | 0.7 | 26.8 | 26.8 | 13.7 | 2.7 |

| | Example | | | Comparative Ex. |
|---|---|---|---|---|
| | 6 | 7 | 8 | Experimental Ex. 1 |
| Composition of resin | | | | |
| PVA | Prep. Ex. 3 | Prep. Ex. 3 | Prep. Ex. 4 | |
| Acetalization ratio (% by mole) | — | — | — | |
| Formal formation ratio (% by mole) | 41 | 41 | 80 | |
| Moiety A content (% by mole) | 1.10 | 1.10 | 0.10 | |
| Moiety B content (% by mole) | 0 | 18.9 | 19.9 | |
| OH content (% by mole) | 48.9 | 39 | 0 | |
| Chain P content (% by weight) | 43 | 43 | 8 | |
| Fluorine content (% by weight) | | | | |
| in ethylenic polymer moiety M | 0 | 0 | 0 | |
| in resin | 29.5 | 29.5 | 5.5 | |

| | Example | | | | |
|---|---|---|---|---|---|
| | 1 | 2 | 3 | 4 | 5 |
| Solubility | | | | | |
| MIBK | ○ | ○ | ○ | ○ | X |
| MEK | ○ | ○ | ○ | ○ | ○ |
| Propyl acetate | ○ | ○ | ○ | ○ | ○ |
| IPA | ○ | ○ | ○ | X | X |
| MIBK/dioxane (1/1) | ○ | ○ | ○ | ○ | ○ |
| Refractive index ($n^D$) | 1.45 | 1.42 | 1.42 | 1.43 | 1.44 |

| | Example | | | Comparative Ex. |
|---|---|---|---|---|
| | 6 | 7 | 8 | Experimental Ex. 1 |
| Solubility | | | | |
| MIBK | X | ○ | ○ | X |
| MEK | ○ | ○ | ○ | X |
| Propyl acetate | X | X | X | X |
| IPA | X | X | X | X |
| MIBK/dioxane (1/1) | ○ | ○ | ○ | X |
| Refractive index ($n^D$) | 1.42 | 1.42 | 1.44 | — |

EXAMPLES 9 to 14

(1) Preparation of Coating Composition for Surface Modification

Homogeneous coating compositions for surface modification (Examples 9 to 14) were prepared by adding 2.0 mg of 2-methyl-1[4-(methylthio)phenyl]-2-morphorinopropane-1-one as the active energy curing initiator (b) and 20 g of methyl ethyl ketone to 0.2 g of the fluorine-containing resins (I) obtained in Examples 1, 3, 4, 5, 7 and 8, respectively.

(2) Surface Treatment of Acryl Panel

The coating compositions for surface modification prepared in (1) above were coated on a non-surface-treated acryl panel at room temperature with a spin coater and dried at room temperature for 30 minutes. The coating was carried out by holding the number of revolutions of the spin coater at 300 rpm for three seconds and then holding the number of revolutions of the spin coater at 1,000 rpm for 20 seconds.

Then the dried coating film was subjected to photo-curing by irradiation of ultraviolet light at an intensity of 1,500 mJ/cm$^2$ in the atmosphere by using a high pressure mercury lamp to obtain a cured coating film.

(3) Evaluation of Physical Properties

With respect to the surface-modified acryl panel obtained in (2) above, the following physical properties of the surface thereof were evaluated. The results are shown in Table 2.

(Friction Coefficient)

A friction coefficient is measured with a reciprocating friction coefficient meter (brand name AFT-15-1S available from Tosoku Seimitsu Kogyo Kabushiki Kaisha) by using a cotton cloth on a contact surface. The friction coefficient of each sample is evaluated by a relative value (index) based on a friction coefficient (100) of the reference antireflection film (control) produced in Reference Example 1.

(Pencil Hardness)

Measured according to JIS K5400.

(Contact Angle)

A contact angle is measured with a contact angle meter (CA-DT available from Kyowa Kaimen Kagaku Kabushiki Kaisha) by using 3 μl each of pure water and n-hexadecane, and a surface free energy (yS) is calculated from the measured contact angles of water and hexadecane.

(Falling Angle)

A droplet of 3 μl n-hexadecane (nHD) is formed on a cured coating film and a testing stand is inclined gradually. When the droplet starts moving downward, an angle of the testing stand to a level is regarded as a falling angle. When the droplet does not fall even at 90°, a falling angle is indicated by "no falling".

(Adhesion of Fingerprint)

A finger is pressed on the coating film on the acryl panel, and whether or not a fingerprint is easily printed is evaluated with naked eyes by the following criteria.

◯: A fingerprint is hardly marked, or does not show remarkably even if marked.
Δ: A fingerprint is less marked, but is fully identified.
X: A fingerprint is marked clearly to the same degree as in non-treated acryl panel.

(Removability of Fingerprint by Wiping)

After the above-mentioned fingerprint adhesion test, the marked fingerprint is wiped back and forth three times using Kimwipe (brand name available from CRECIA CORPORATION), and easiness of wiping off the marked fingerprint is evaluated with naked eyes by the following criteria.

◯: A fingerprint can be removed completely.
Δ: A wiping mark of fingerprint is left.
X: A wiping mark is enlarged and is hardly removed.

REFERENCE EXAMPLE 1

Production of Reference Antireflection Film: cf. Experimental Example 24 of WO02/018457

(1) Preparation of Fluorine-containing Allyl Ether Homopolymer having Hydroxyl

Into a 100 ml four neck glass flask equipped with a stirrer and thermometer were poured 20.8 g of perfluoro-(1,1,9,9-tetrahydro-2,5-bistrifluoromethyl-3,6-dioxanonenol) and 2.2 g of perfluorohexane solution of 8.0% by weight of [H(CF$_2$CF$_2$)$_3$]$_2$, and after the inside of the flask was sufficiently replaced with nitrogen, stirring was carried out at 20° C. for 24 hours in a stream of nitrogen, and a highly viscous solid was produced.

The obtained solid was dissolved in diethyl ether and poured into perfluorohexane, followed by separation and vacuum drying to obtain 19.2 g of colorless transparent polymer.

As a result of $^{19}$F-NMR, $^1$H-NMR and IR analyses, the polymer was found to be the fluorine-containing polymer consisting of a structural unit of the above-mentioned fluorine-containing allyl ether and having hydroxyl at an end of its side chain. A number average molecular weight of the polymer measured by GPC analysis (solvent: THF) was 72,000, and a weight average molecular weight thereof was 118,000.

(2) Preparation of Solution of Fluorine-containing Polymer having α-fluoroacryloyl Group Into a 200 ml four neck flask equipped with a reflux condenser, thermometer, stirrer and dropping funnel were poured 50 ml of methyl ethyl ketone (MEK), 5.0 g of fluorine-containing allyl ether homopolymer having hydroxyl obtained in (1) above and 2.5 g of pyridine, followed by cooling to 5° C. or less with ice.

Thereto was added dropwise over about 10 minutes a solution obtained by dissolving 2.5 g of α-fluoroacrylic acid fluoride: CH$_2$=CFCOF in 10 ml of MEK, with stirring in a stream of nitrogen.

After completion of the addition, the mixture temperature was elevated to room temperature and stirring was further continued for 2.0 hours.

The MEK solution after the reaction was poured into the dropping funnel, and after repeating washing with water, 2% hydrochloric acid solution, 5% NaCl solution and then water, was dried with anhydrous magnesium sulfate, followed by separation of the solution by filtration to obtain a MEK solution. The polymer concentration was 13% by weight.

According to $^{19}$F-NMR analysis of this MEK solution, the obtained product was found to be a copolymer comprising fluorine-containing allyl ether having —OCOCF=CH$_2$ group/fluorine-containing allyl ether having OH group in a percent by mole ratio of 70/30.

This solution was coated on a NaCl panel to form a cast film at room temperature. According to IR analysis of this film, there were observed an absorption of carbon-carbon double bond at 1,661 cm$^{-1}$ and an absorption of C=O group at 1,770 cm$^{-1}$.

(3) Preparation of Fluorine-containing Resin Composition for Coating

MEK was added to the solution of fluorine-containing polymer having α-fluoroacryloyl group obtained in (2) above for dilution of the solution to adjust the polymer concentration to 5.0% by weight.

To 10 g of the obtained polymer solution was added, as an active energy curing initiator, 1.2 g of a solution obtained by dissolving 2-hydroxy-2-methylpropiophenone in MEK in a concentration of 1% by weight to obtain a uniform solution.

(4) Production of Antireflection Film

The above coating composition was coated on a non-treated acryl panel at room temperature at 1,000 to 2,000 rpm with a spin coater, followed by drying at 50° C. for five minutes. In this case, the number of revolutions of the spin coater was adjusted so that the coating thickness after the drying became 90 to 110 nm.

The dried coating film was subjected to irradiation of ultraviolet light at an intensity of 1,500 mJ/cm$^2$U at room temperature by using a high pressure mercury lamp to produce an antireflection film.

COMPARATIVE EXAMPLE 1

With respect to a non-surface-treated acryl panel, various physical properties were measured in the same manner as in Example 9. The results are shown in Table 2.

TABLE 2

| | Example | | | |
|---|---|---|---|---|
| | 9 | 10 | 11 | 12 |
| Fluorine-containing resin (I) | Example 1 | Example 3 | Example 4 | Example 5 |
| Content of chain P (% by weight) | 1 | 39 | 20 | 4 |
| Content of moiety B (% by mole) | 2.39 | 31.97 | 4.7 | 16.95 |
| Content of OH group (% by mole) | 31.6 | 1 | 0 | 42 |
| Physical properties of modified surface | | | | |
| Pencil hardness | 4H | 4H | 4H | 4H |
| Friction coefficient (index) | 29 | 15 | 18 | 24 |
| Contact angle | | | | |
| Water | 82.2 | 104.2 | 110.5 | 65.7 |
| nHD | 69.3 | 66.3 | 65.5 | 65.3 |
| γ$^s$ | 24.6 | 15.5 | 14.5 | 36.5 |
| Falling angle of nHD (°) | no falling | 44 | 51 | no falling |
| Adhesion of fingerprint | Δ | Δ | Δ | Δ |
| Removability of fingerprint by wiping | Δ | ○ | ○ | Δ |

| | Example | | | Ref. Ex. 1 |
|---|---|---|---|---|
| | 13 | 14 | Com. Ex. 1 | (control) |
| Fluorine-containing resin (I) | Example 7 | Example 8 | Acryl panel | Antireflection film |
| Content of chain P (% by weight) | 43 | 8 | — | — |
| Content of moiety B (% by mole) | 18.9 | 19.9 | — | 70 |
| Content of OH group (% by mole) | 39 | 0 | — | 30 |
| Physical properties of modified surface | | | | |
| Pencil hardness | 4H | 4H | 3H | H |
| Friction coefficient (index) | 12 | 19 | 59 | 100 |
| Contact angle | | | | |
| Water | 109.3 | 118 | 67.8 | 90.8 |
| nHD | 65.5 | 93.7 | 2.5 | 48.7 |
| γ$^s$ | 14.7 | 7.2 | 40.3 | 23.6 |
| Falling angle of nHD (°) | 38 | no falling | no falling | no falling |
| Adhesion of fingerprint | Δ | Δ | Δ | X |
| Removability of fingerprint by wiping | ○ | Δ | X | X |

EXAMPLES 15 to 18

Improvement of Physical Properties of Antireflection Film Surface (1) Preparation of Coating Composition for Surface Modification Coating compositions for surface modification (Examples 15 to 18) were prepared in the same manner as in Example 9 except that the fluorine-containing resins obtained in Examples 1, 4, 7 and 8, respectively were used.

(2) Surface Modification of Antireflection Film

The coating compositions for surface modification prepared in (1) above were coated on an antireflection film for control produced in Reference Example 1 at room temperature with a spin coater and dried at room temperature for 30 minutes. The coating was carried out by holding the number of revolutions of the spin coater at 300 rpm for three seconds and then holding the number of revolutions of the spin coater at 1,000 rpm for 20 seconds.

Then the dried coating films were subjected to photo-curing by irradiation of ultraviolet light at an intensity of 1,500 mJ/cm$^2$ in the atmosphere by using a high pressure mercury lamp to obtain antireflection films.

(3) Evaluation of Physical Properties

With respect to the surface-modified antireflection films (on the acryl panel) obtained in (2) above, a friction coefficient, pencil hardness, contact angle, falling angle, adhesion of fingerprint and removability of fingerprint by wiping were evaluated in the same manner as in Example 9, and in addition, a reflectance was measured. The results are shown in Table 3.

(Measurement of Reflectance)

The reflectance is measured with a visible ultraviolet light spectrophotometer equipped with a 5° regular reflection unit using light having a wavelength of 550 nm.

COMPARATIVE EXAMPLE 2

With respect to an antireflection film (control) produced in Reference Example 1, a friction coefficient, pencil hardness, contact angle, falling angle, adhesion of fingerprint, removability of fingerprint by wiping and reflectance were evaluated in the same manner as in Example 15. The results are shown in Table 3.

tions of coating composition for surface modification (Examples 23 to 26) were prepared in the same manner as above by adding 100 mg each of fluorine-containing resins obtained in Examples 3, 7, 2 and 6, respectively to the fluorine-containing resin composition for coating prepared by the method described in (3) of Reference Example 1. Further a uniform solution of coating composition for surface modification (Comparative Example 3) was prepared in the same manner as above by adding 100 mg of fluorine-containing resin obtained in Example 1 to the fluorine-containing resin composition for coating prepared by the method described in (3) of Reference Example 1.

With respect to each of the obtained coating compositions for surface modification, a refractive index was measured in the same manner as in Example 1. The results are shown in Table 4.

(2) Production of Antireflection Film

The coating compositions for surface modification prepared in (1) above were coated on a non-surface-treated acryl panel at room temperature with a spin coater and dried at room temperature for 30 minutes. The coating was carried out by holding the number of revolutions of the spin coater at 300 rpm for three seconds and then holding the number of revolutions of the spin coater at 1,000 to 1,500 rpm for 20 seconds. In this case, the number of revolutions of the spin coater was adjusted so that the coating thickness after the drying became 90 to 110 nm.

Then the dried coating films were subjected to photo-curing by irradiation of ultraviolet light at an intensity of 1,500

TABLE 3

| | Example | | | | Com. Ex. 2 |
| --- | --- | --- | --- | --- | --- |
| | 15 | 16 | 17 | 18 | (control) |
| Fluorine-containing resin (I) | Example 1 | Example 8 | Example 4 | Example 7 | Antireflection film |
| Content of chain P (% by weight) | 1 | 8 | 20 | 43 | — |
| Content of moiety B (% by mole) | 2.39 | 19.9 | 4.7 | 18.9 | 70 |
| Content of OH group (% by mole) | 31.6 | 0 | 0 | 39 | 30 |
| Antireflection film | Ref. Ex. 1 | Ref. Ex. 1 | Ref. Ex. 1 | Ref. Ex. 1 | Ref. Ex. 1 |
| Physical properties of modified surface | | | | | |
| Pencil hardness | 3H | 4H | 5H | 5H | H |
| Friction coefficient (index) | 59 | 41 | 29 | 18 | 100 |
| Contact angle | | | | | |
| Water | 85.4 | 92.8 | 99.7 | 107.3 | 90.8 |
| nHD | 68.3 | 51.8 | 55.5 | 63.5 | 48.7 |
| γ$^s$ | 22.9 | 22.2 | 19.1 | 15.5 | 23.6 |
| Falling angle of nHD (°) | no falling | no falling | 48 | 39 | no falling |
| Adhesion of fingerprint | Δ | Δ | Δ | Δ | X |
| Removability of fingerprint by wiping | Δ | Δ | ○ | ○ | X |
| Reflectance (λ = 550 nm) | 1.3% | 1.3% | 1.2% | 1.2% | 1.2% |

EXAMPLES 19 to 26 and COMPARATIVE EXAMPLE 3
(1) Preparation of Fluorine-containing Resin Composition for Coating Uniform solutions of coating composition for surface modification (Examples 19 to 22) were prepared by adding 50 mg each of the fluorine-containing resins obtained in Examples 3, 7, 2 and 6, respectively to the fluorine-containing resin composition for coating prepared by the method described in (3) of Reference Example 1. Also uniform solumJ/cm$^2$ in the atmosphere by using a high pressure mercury lamp to obtain antireflection films.

(3) Evaluation of Physical Properties

With respect to the surface-modified acryl panel obtained in (2) above, a friction coefficient, pencil hardness, contact angle, falling angle, adhesion of fingerprint, removability of fingerprint by wiping and reflectance were evaluated in the same manner as in Example 15. The results are shown in Table 4.

TABLE 4

|  | Example 19 | Example 20 | Example 21 | Example 22 | Example 23 | Example 24 | Example 25 | Example 26 | Com. Ex. 3 | Com. Ex. 2 (control) |
|---|---|---|---|---|---|---|---|---|---|---|
| Fluorine-containing resin | Ex. 3 | Ex. 7 | Ex. 2 | Ex. 6 | Ex. 3 | Ex. 7 | Ex. 2 | Ex. 6 | Ex. 1 |  |
| Content of chain P (% by weight) | 39 | 43 | 39 | 43 | 39 | 43 | 39 | 43 | 1 |  |
| Content of moiety B (% by mole) | 31.97 | 18.9 | 0 | 0 | 31.97 | 18.9 | 0 | 0 | 2.39 | None |
| Content of OH group (% by mole) | 1 | 39 | 33.07 | 48.9 | 1 | 39 | 33.07 | 48.9 | 31.6 |  |
| Fluorine content (% by weight) | 26.8 | 29.5 | 26.8 | 29.5 | 26.8 | 29.5 | 26.8 | 29.5 | 0.69 |  |
| Composition for forming antireflection film | Ref. Ex. 1 | Ref. Ex. 1 | Ref. Ex. 1 | Ref. Ex. 1 | Ref. Ex. 1 | Ref. Ex. 1 | Ref. Ex. 1 | Ref. Ex. 1 | Ref. Ex. 1 | Ref. Ex. 1 |
| Adding amount of fluorine-containing resin (% by weight) | 10 | 10 | 10 | 10 | 20 | 20 | 20 | 20 | 20 | — |
| Refractive index ($n^D$) | 1.378 | 1.377 | 1.378 | 1.377 | 1.382 | 1.381 | 1.382 | 1.381 | 1.387 | 1.374 |
| Physical properties of modified surface |  |  |  |  |  |  |  |  |  |  |
| Pencil hardness | 4H | 4H | 3H | 3H | 4H | 4H | 3H | 3H | 2H | H |
| Friction coefficient (index) | 41 | 35 | 38 | 31 | 35 | 29 | 31 | 26 | 82 | 100 |
| Contact angle |  |  |  |  |  |  |  |  |  |  |
| Water | 98.5 | 96.5 | 96.2 | 95.4 | 98.7 | 98.5 | 99.3 | 98.9 | 92.5 | 90.8 |
| nHD | 57.7 | 53 | 58.3 | 59.1 | 60.2 | 57.1 | 60.5 | 60.8 | 49 | 48.7 |
| $\gamma^s$ | 19.1 | 20.7 | 19.7 | 19.8 | 18.4 | 19.2 | 18.2 | 18.3 | 22.9 | 23.6 |
| Adhesion of fingerprint | Δ | Δ | Δ | Δ | Δ | Δ | Δ | Δ | X | X |
| Removability of fingerprint by wiping | Δ | Δ | Δ | Δ | ○ | ○ | ○ | ○ | X | X |
| Reflectance (λ = 550 nm) | 1.2 | 1.2 | 1.2 | 1.2 | 1.3 | 1.3 | 1.3 | 1.3 | 1.5 | 1.2 |

EXAMPLES 27 and 28 and COMPARATIVE EXAMPLES 4 and 5

Solvent Resistance of Surface Modifier Layer (1) Preparation of Fluorine-containing Resin Composition for Coating Coating compositions for surface modification (Examples 27 and 28) were prepared in the same manner as in Example 9 except that the fluorine-containing resins (I) prepared in Examples 3 and 7, respectively were used. Similarly coating compositions for surface modification (Comparative Examples 4 and 5) were prepared in the same manner as in Example 9 except that the fluorine-containing resins (IA) prepared in Examples 2 and 6, respectively were used.

(2) Surface Treatment of Acryl Panel

Cured films were formed on an acryl panel in the same manner as in Example 9 except that the coating compositions for surface modification prepared in (1) above were used.

(3) Evaluation of Solvent Resistance

The surface-modified acryl panel obtained in (2) above was subjected to wiping treatment mentioned below, and change of properties thereof after the treatment was evaluated. The results are shown in Table 5.

(Wiping Treatment)

The whole cured film surface is lightly wiped back and forth once with a cotton cloth impregnated with ethanol.

Particulars of measurement are a friction coefficient, contact angle of n-hexadecane, adhesion of fingerprint and removability of fingerprint by wiping. Measurements are carried out by the same methods as in Example 9.

(3) Evaluation of Antireflection Film

With respect to the antireflection film surface-modified in (2) above, a friction coefficient, pencil hardness, contact angle, adhesion of fingerprint and removability of fingerprint by wiping were evaluated in the same manner as in Example 9, and in addition, a haze value and a reflectance were mea-

TABLE 5

|  | Example | | Comparative Example | |
|---|---|---|---|---|
|  | 27 | 28 | 4 | 5 |
| Fluorine-containing resin | Example 3 | Example 7 | Example 2 | Example 6 |
| Content of chain P (% by weight) | 39 | 43 | 39 | 43 |
| Content of moiety B (% by mole) | 31.97 | 18.9 | 0 | 0 |
| Content of OH group (% by mole) | 1 | 39 | 33.07 | 48.9 |
| Property of modified surface (durability) | | | | |
| Before wiping | | | | |
| Friction coefficient (index) | 20 | 18 | 20 | 18 |
| Contact angle (nHD) | 64.3 | 63.5 | 66.2 | 63.8 |
| Adhesion of fingerprint | Δ | Δ | Δ | Δ |
| Removability of fingerprint by wiping | ○ | ○ | ○ | ○ |
| After wiping | | | | |
| Friction coefficient (index) | 20 | 18 | 94 | 82 |
| Contact angle (nHD) | 63.6 | 64.1 | 11.2 | 23.5 |
| Adhesion of fingerprint | Δ | Δ | Δ | Δ |
| Removability of fingerprint by wiping | ○ | ○ | X | X |

EXAMPLE 29

(1) Preparation of Fluorine-containing Resin Composition for Coating

MEK was added to the solution of fluorine-containing polymer having α-fluoroacryloyl group prepared by the method described in (2) of Reference Example 1 for dilution of the solution to adjust the polymer concentration to 5.0% by weight. To 560 g of this polymer solution were added 10 g of the fluorine-containing resin obtained in Example 3 and 200 g of propyl acetate, and after the stirring, the resultant solution was filtrated with a polypropylene filter having a pore size of 1 μm to obtain a coating composition.

(2) Production of Antireflection Film

A 100 μm thick PET film, one surface of which had been subjected to hard coat treatment (refractive index: 1.52, thickness: 5 μm) was used as a substrate. The coating composition of (1) above was coated on the treated surface of the substrate. The coating was carried out by using a doctor blade and a 230 mm diameter micro gravure roll having a gravure pattern of 180 lines/inch and 40 μm depth under the conditions of the number of revolutions of gravure roll of 13 rpm and a transfer speed of 5 m/min, and after drying at 70° C., the dried film was subjected to irradiation of ultraviolet light for curing by using air-cooled metal halide lamp (available from Eye Graphics Kabushiki Kaisha) of 240 W/cm under nitrogen purging, followed by winding of the cured film.

sured by the following methods. The results are shown in Table 6.

(Measurement of Haze Value)

A haze value of the film is measured according to JIS K6714 by using a direct-reading haze meter available from Toyo Seiki Seisakusho.

(Measurement of Reflectance)

A back surface (non-coated surface) of the film is sufficiently ground with a #240 sand paper and coated with a sprayer of black color. A reflectance of the film surface subjected to reflection reducing coating is measured by the same method as in Example 15.

COMPARATIVE EXAMPLE 6

With respect to a film which was not subjected to reflection reducing coating (surface subjected to hard coat treatment), various physical properties were measured in the same manner as in (3) of Example 29. The results are shown in Table 6.

TABLE 6

|  | Example 29 | Com. Ex. 6 |
|---|---|---|
| Fluorine-containing resin | Example 3 | None |
| Content of chain P (% by weight) | 39 |  |
| Content of moiety B (% by mole) | 31.97 |  |
| Content of OH group (% by mole) | 1 |  |
| Physical properties of film |  |  |
| Pencil hardness | 2H | 2H |
| Friction coefficient (index) | 25 | 60 |
| Contact angle |  |  |
| Water | 102 | 69.2 |
| nHD | 58.5 | 2.5 |
| $\gamma^s$ | 17.9 | 39.5 |
| Adhesion of fingerprint | Δ | Δ |
| Removability of fingerprint by wiping | ○ | X |

TABLE 6-continued

|  | Example 29 | Com. Ex. 6 |
|---|---|---|
| Reflectance (λ = 550 nm) | 1.5% | 5.0% |
| Haze value | 1.2% | 0.5% |

PREPARATION EXAMPLE 5

Preparation of Resin (IB)

Into a 100 ml four neck flask equipped with a reflux condenser, thermometer, stirrer and dropping funnel were poured 20 ml of dioxane, 2.0 g of the PVA subjected to formal formation which was obtained in Preparation Example 3 and 1.0 g of pyridine, followed by sufficiently stirring for dissolution. Then to the resultant solution was added dropwise over about 10 minutes a solution obtained by dissolving 1.0 g of $CH_2$=CFCOF for introducing the moiety B in 5 ml of diethyl ether. After completion of the addition, the stirring was further continued for about three hours. To the dioxane solution after the reaction was added 20 ml of diethyl ether. The obtained solution was poured into the dropping funnel and washed with water, 2% hydrochloric acid solution and then water, followed by drying with anhydrous magnesium sulfate. Then the anhydrous magnesium sulfate was removed by filtration. Ether was distilled off from this ether solution, and a reaction product was taken out.

The obtained reaction product was dissolved in acetone-$d^6$, followed by measuring with $^{19}$F-NMR and $^1$H-NMR. From the results of the measurements, the reaction product was found to be the resin (IB) having a composition shown in Table 7.

TABLE 7

| Resin composition | Preparation Example 5 |
|---|---|
| PVA | Preparation Example 3 |
| Formal formation ratio (% by mole) | 41 |
| Content of moiety A (% by mole) | 0 |
| Content of moiety B (% by mole) | 15.5 |
| Content of OH group (% by mole) | 43.5 |
| Fluorine content (% by weight) | 0 |

EXAMPLE 30

(1) Preparation of Coating Composition for Surface Modification

A uniform coating composition for surface modification was prepared by adding 0.1 g of the resin (IB) obtained in Preparation Example 5, 2.0 mg of 2-methyl-1[4-(methylthio) phenyl]-2-morpholinopropane-1-one as an active energy curing initiator (b) and 20 g of methyl ethyl ketone to 0.1 g of the fluorine-containing resin (IA) obtained in Example 6.

(2) Surface Treatment of Acryl Panel

An acryl panel was subjected to surface treatment in the same manner as in Example 9.

(3) Evaluation of Physical Properties

With respect to the surface-treated acryl panel obtained in (2) above, a friction coefficient, pencil hardness, contact angle, falling angle, adhesion of fingerprint and removability of fingerprint by wiping were evaluated in the same manner as in Example 9. The results are shown in Table 8.

(4) Evaluation of Solvent Resistance

With respect to the surface-treated acryl panel obtained in (2) above, solvent resistance was evaluated in the same manner as in Example 27. The results are shown in Table 9.

COMPARATIVE EXAMPLE 7

A coating composition was prepared in the same manner as in (1) of Example 9 except that the resin (IB) obtained in Preparation Example 5 was used, and an acryl panel was surface-treated in the same manner as in (2) of Example 9 by using the obtained composition. With respect to this surface-treated acryl panel, a friction coefficient, pencil hardness, contact angle, falling angle, adhesion of fingerprint and removability of fingerprint by wiping were evaluated in the same manner as in (3) of Example 9. The results are shown in Table 8.

TABLE 8

|  | Example 30 | Com. Ex. 7 |
|---|---|---|
| Coating resin composition (IA)/(IB) wt % | 50/50 | 0/100 |
| Fluorine-containing resin (IA) | Example 6 |  |
| Content of chain P (% by weight) | 43 |  |
| Content of moiety B (% by mole) | 0 |  |
| Content of OH group (% by mole) | 48.9 |  |
| Resin (IB) | Prep. Ex. 5 | Prep. Ex. 5 |
| Content of chain P (% by weight) | 0 | 0 |
| Content of moiety B (% by mole) | 15.5 | 15.5 |
| Content of OH group (% by mole) | 31.6 | 31.6 |
| Physical properties of modified surface |  |  |
| Pencil hardness | 4H | 3H |
| Friction coefficient (index) | 21 | 55 |
| Contact angle |  |  |
| Water | 100.5 | 64.5 |
| nHD | 67.5 | 12.0 |
| $\gamma^s$ | 16.1 | 42 |
| Falling angle of nHD (°) | no falling | no falling |
| Adhesion of fingerprint | Δ | X |
| Removability of fingerprint by wiping | ○ | X |

TABLE 9

|  | Example 30 |
|---|---|
| Coating resin composition (IA)/(IB) wt % | 50/50 |
| Fluorine-containing resin (IA) | Example 6 |
| Content of chain P (% by weight) | 43 |
| Content of moiety B (% by mole) | 0 |
| Content of OH group (% by mole) | 48.9 |
| Resin (IB) | Prep. Ex. 5 |
| Content of chain P (% by weight) | 0 |
| Content of moiety B (% by mole) | 15.5 |
| Content of OH group (% by mole) | 31.6 |
| Before wiping |  |
| Friction coefficient (index) | 21 |
| Contact angle (nHD) | 67.5 |

TABLE 9-continued

|  | Example 30 |
|---|---|
| Adhesion of fingerprint | Δ |
| Removability of fingerprint by wiping | ○ |
| After wiping | |
| Friction coefficient (index) | 21 |
| Contact angle (nHD) | 68.0 |
| Adhesion of fingerprint | Δ |
| Removability of fingerprint by wiping | ○ |

EXAMPLE 31

(1) Surface Modification of Antireflection Film

An antireflection film was subjected to surface modification in the same manner as in (2) of Example 15 except that the coating composition for surface modification obtained in Example 30 was used.

(2) Evaluation of Physical Properties

With respect to the surface-modified antireflection film (on the acryl panel) obtained in (1) above, a friction coefficient, pencil hardness, contact angle, falling angle, adhesion of fingerprint and removability of fingerprint by wiping were evaluated in the same manner as in Example 9, and in addition, a reflectance was measured in the same manner as in Example 15. The results are shown in Table 10.

COMPARATIVE EXAMPLE 8

(1) Surface Modification of Antireflection Film

An antireflection film was subjected to surface modification in the same manner as in (2) of Example 15 except that the coating composition obtained in Comparative Example 7 was used.

(2) Evaluation of Physical Properties

With respect to the surface-modified antireflection film (on the acryl panel) obtained in (1) above, a friction coefficient, pencil hardness, contact angle, falling angle, adhesion of fingerprint and removability of fingerprint by wiping were evaluated in the same manner as in Example 9, and in addition, a reflectance was measured in the same manner as in Example 15. The results are shown in Table 10.

TABLE 10

|  | Example 31 | Com. Ex. 8 | Com. Ex. 2 (control) |
|---|---|---|---|
| Coating resin composition (IA)/(IB) wt % | 50/50 | 0/100 |  |
| Fluorine-containing resin (IA) | Example 6 |  | Antireflection film |
| Content of chain P (% by weight) | 43 | — |  |
| Content of moiety B (% by mole) | 0 |  | 70 |
| Content of OH group (% by mole) | 48.9 |  | 30 |
| Resin (IB) | Prep. Ex. 5 | Prep. Ex. 5 |  |
| Content of chain P (% by weight) | 0 | 0 |  |
| Content of moiety B (% by mole) | 15.5 | 15.5 |  |
| Content of OH group (% by mole) | 31.6 | 31.6 |  |
| Antireflection film | Ref. Ex. 1 | Ref. Ex. 1 | Ref. Ex. 1 |
| Physical properties of modified surface |  |  |  |
| Pencil hardness | 4H | 2H | H |
| Friction coefficient (index) | 21 | 55 | 100 |
| Contact angle |  |  |  |
| Water | 100.5 | 89.2 | 90.8 |
| nHD | 67.5 | 45.7 | 48.7 |
| $\gamma^s$ | 16.1 | 24.9 | 23.6 |
| Falling angle of nHD (°) | no falling | no falling | no falling |
| Adhesion of fingerprint | Δ | X | X |
| Removability of fingerprint by wiping | Δ | X | X |
| Reflectance ($\lambda$ = 550 nm) | 1.25% | 1.30% | 1.20% |

INDUSTRIAL APPLICABILITY

According to the present invention, properties of surfaces of various coating films, particularly surface sliding property (decrease of friction coefficient), surface hardness, abrasion resistance, scratch resistance, chemical resistance, stain removability by wiping, water repellency and oil repellency can be improved, and the modified properties can be imparted to the surfaces of original coating films.

Particularly surface sliding property of an antireflection film can be improved without lowering transparency thereof, and a reflection reducing ability can be maintained for a long period of time.

The invention claimed is:

1. A curable surface modifier comprising a curable fluorine-containing resin (I) which is soluble in general purpose solvents and has a fluorine content of not less than 0.1% by weight and not more than 35% by weight, said curable fluorine-containing resin (I) comprises a fluorine-containing ethylenic polymer (IAB) having a moiety A and a moiety B in at least a part of the same side chain or different side chains thereof or comprises a fluorine-containing ethylenic polymer (IA) having a moiety A in at least a part of its side chain and a fluorine-containing ethylenic polymer (IB) having a moiety B in at least a part of its side chain, in which the moiety A has, at its end, one or two or more polyfluoropolyether chains P represented by the formula (1):

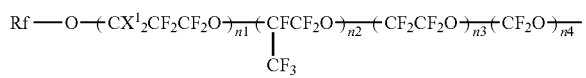

wherein n1, n2, n3 and n4 are the same or different and each is 0 or an integer of 1 or more and n1+n2+n3+n4 is an integer of not less than 10; $X^1$ are the same or different and each is H, F or Cl; Rf is a fluorine-containing alkyl group having 1 to 10 carbon atoms, the moiety B has one or two or more self-crosslinkable functional groups Y at its end, and an ethylenic polymer moiety M remaining by excluding the moiety A and the moiety B from the fluorine-containing ethylenic polymer constituting the resin (I) does not contain fluorine atom or is an ethylenic polymer moiety in which a part of hydrogen atoms thereof are replaced by fluorine atoms up to a fluorine content of not more than 10% by weight, and the ethylenic polymer moiety M contains a structural unit of the formula (2):

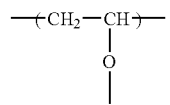

or the formula (3):

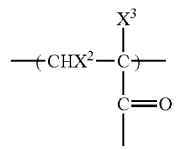

wherein $X^2$ is H or a bond; $X^3$ is H, F or $CH_3$.

2. The curable surface modifier of claim 1, wherein the self-crosslinkable functional group Y of the moiety B is at least one selected from the group consisting of

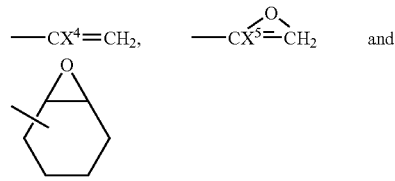

wherein $X^4$ is H, $CH_3$ or F; $X^5$ is H or $CH_3$.

3. A method of modifying a surface of a substrate which comprises applying the curable surface modifier of claim 1 on the substrate and curing.

4. The surface modifying method of claim 3, wherein the substrate is one having an antireflection film on its surface.

5. The curable surface modifier of claim 1, wherein said general purpose solvents are organic solvents having no fluorine atom.

* * * * *